(12) United States Patent
Haishima

(10) Patent No.: US 11,455,866 B2
(45) Date of Patent: Sep. 27, 2022

(54) INFORMATION MANAGEMENT SYSTEM AND TERMINAL DEVICE

(71) Applicant: Universal Entertainment Corporation, Tokyo (JP)

(72) Inventor: Jun Haishima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 274 days.

(21) Appl. No.: 16/703,169

(22) Filed: Dec. 4, 2019

(65) Prior Publication Data

US 2020/0184771 A1 Jun. 11, 2020

(30) Foreign Application Priority Data

Dec. 11, 2018 (JP) ................. 2018-231910

(51) Int. Cl.
*G07F 17/32* (2006.01)
*G06Q 50/34* (2012.01)
*G06Q 20/34* (2012.01)

(52) U.S. Cl.
CPC ....... *G07F 17/3244* (2013.01); *G06Q 20/341* (2013.01); *G06Q 20/3433* (2013.01); *G06Q 50/34* (2013.01)

(58) Field of Classification Search
CPC .. G06Q 20/341; G06Q 20/3433; G06Q 50/34; G07F 17/3244
See application file for complete search history.

(56) References Cited

U.S. PATENT DOCUMENTS

| | | | | |
|---|---|---|---|---|
| 6,106,395 A | * | 8/2000 | Begis | A63F 13/12 463/23 |
| 6,110,041 A | * | 8/2000 | Walker | G07F 17/32 273/139 |
| 7,033,276 B2 | * | 4/2006 | Walker | G07F 17/32 463/40 |
| 2003/0162588 A1 | * | 8/2003 | Brosnan | G06Q 30/0207 463/25 |
| 2006/0080175 A1 | * | 4/2006 | Rowe | G07F 17/32 705/14.12 |

(Continued)

*Primary Examiner* — Steve Rowland
(74) *Attorney, Agent, or Firm* — Simpson & Simpson, PLLC; S. Peter Konzel

(57) ABSTRACT

A terminal device includes: an information medium payout device that pays out an information medium associated with balance information representing a balance of a game value according to a result of a game; and a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to an information processing device, and the information processing device includes a history information storage device that stores the information medium identification information as unique history information associated with the information medium identification information, and a determination device that determines a game dependent state of a player based upon the history information.

16 Claims, 15 Drawing Sheets

(56) References Cited

U.S. PATENT DOCUMENTS

| | | | | |
|---|---|---|---|---|
| 2008/0096650 A1* | 4/2008 | Baerlocher | ............ | G07F 17/34 |
| | | | | 463/30 |
| 2009/0005173 A1* | 1/2009 | Bisson | .................... | G07F 17/32 |
| | | | | 463/29 |
| 2010/0087247 A1* | 4/2010 | Joshi | ..................... | G07F 17/323 |
| | | | | 463/29 |
| 2010/0298044 A1* | 11/2010 | Acres | ....................... | G07F 17/34 |
| | | | | 463/30 |
| 2013/0225262 A1* | 8/2013 | Thompson | .......... | G07F 17/3248 |
| | | | | 463/25 |
| 2013/0225268 A1* | 8/2013 | Caputo | ............... | G07F 17/3237 |
| | | | | 463/25 |
| 2014/0364238 A1* | 12/2014 | Koh | ....................... | A63F 13/00 |
| | | | | 463/42 |
| 2015/0141123 A1* | 5/2015 | Callaway | ............ | G07F 17/3206 |
| | | | | 463/25 |

\* cited by examiner

|  | LIMITED | UNLIMITED |
|---|---|---|
| IN PRINCIPLE TREATED AS CASH EQUIVALENT | AR1 | AR2 |
| IN PRINCIPLE NOT TREATED AS CASH EQUIVALENT | AR3 | AR4 |

FIG.9A

| \multicolumn{5}{c}{SLOT MACHINE IDENTIFICATION INFORMATION (0010)} |
|---|---|---|---|---|
| \multicolumn{5}{c}{INFORMATION CARD IDENTIFICATION INFORMATION (0001): CONTINUOUS USE "0"} |
| DATE | INSERTED AMOUNT | GAME RESULT | BALANCE | NUMBER OF PAYOUTS |
| 20180801 10:00 | 50(CASH) | — | 50 | — |
| 20180801 10:05 | — | △△△ | 80 | — |
| 20180801 10:10 | — | ××× | 20 | — |
| 20180801 10:15 | 30(CASH) | — | 50 | — |
| ⋮ | ⋮ | ⋮ | ⋮ | ⋮ |
| 20180801 11:00 | — | ○○○ | 60 | — |
| 20180801 11:05 | — | — | 0 | 60 |

FIG.9B

| \multicolumn{5}{c}{SLOT MACHINE IDENTIFICATION INFORMATION (0011)} |
|---|---|---|---|---|
| \multicolumn{5}{c}{INFORMATION CARD IDENTIFICATION INFORMATION (0001): CONTINUOUS USE "1"} |
| DATE | INSERTED AMOUNT | GAME RESULT | BALANCE | NUMBER OF PAYOUTS |
| 20180801 11:30 | 60(CARD) | — | 60 | — |
| ⋮ | ⋮ | ⋮ | ⋮ | ⋮ |
| 20180801 12:00 | — | — | 0 | 10 |

FIG.10

| INFORMATION CARD IDENTIFICATION INFORMATION (0001) |||||||
|---|---|---|---|---|---|
| DATE | INSERTED AMOUNT | GAME RESULT | BALANCE | NUMBER OF PAYOUTS | SLOT MACHINE IDENTIFICATION INFORMATION |
| 20180801 10:00 | 50(CASH) | — | 50 | — | 0010 |
| 20180801 10:05 | — | △△△ | 80 | — | 0010 |
| 20180801 10:10 | — | ××× | 20 | — | 0010 |
| ⋮ | ⋮ | ⋮ | ⋮ | ⋮ | ⋮ |
| 20180801 11:00 | — | ○○○ | 60 | — | 0010 |
| 20180801 11:05 | — | — | 0 | 60 | 0010 |
| 20180801 11:30 | 60(CARD) | — | 60 | — | 0011 |
| ⋮ | ⋮ | ⋮ | ⋮ | ⋮ | ⋮ |
| 20180801 12:00 | — | — | 0 | 10 | 0011 |

INFORMATION MANAGEMENT SYSTEM AND TERMINAL DEVICE

CROSS-REFERENCE TO RELATED APPLICATION

This application claims the benefit of Japanese Pat. App. No. 2018-231910, filed on Dec. 11, 2018, which application is incorporated herein by reference in its entirety.

FIELD OF THE INVENTION

The present invention relates generally to, for example, an information management system and a terminal device in a game hall where a plurality of game machines such as a slot machine are disposed.

BACKGROUND OF THE INVENTION

In a related art, known is a slot machine that displays a plurality of symbols in a stopped state after displaying the plurality of symbols in a scrolled manner, and provides a game medium (for example, a coin) based upon a combination of the symbols in the stopped state. Disclosed is a slot machine capable of allowing a player to feel an attractive payout rate by advancing a game while impressing the player that the game is in an advantageous state.

Meanwhile, when the player is fascinated by such a slot machine and becomes addicted to the game, the player may play the game beyond an initially scheduled investment amount or beyond the initially scheduled game time. Even though the addiction will bring a benefit to a game facility in the short term, the player may be exhausted in a short period of time and thus may even consider avoiding the game in the long term, such that there is a possibility of being disadvantageous to both the game facility and the player.

As a method for solving the above-described problem, a behavior tracking system for tracking a behavior of a specific player is considered (refer to US-A-2010-0298044).

BRIEF SUMMARY OF THE INVENTION

The above-described behavior tracking system is required to specify a player to be tracked in advance, and thus the player whose behavior is to be tracked should voluntarily (or by a family of the player) present personally identifiable information and perform membership registration. However, there is a possibility that a large number of players having serious dependency may play a game without performing the membership registration.

The present invention has been made considering the above-described circumstances, and an object thereof is to provide an information management system and a terminal device capable of assisting to prevent a player from being addicted to a game even against a non-registered player.

An information management system of the present invention includes: a terminal device communicably connected to a gaming machine capable of playing a game according to an inserted game value; and an information processing device capable of communicating with the terminal device, in which the terminal device includes an information medium payout device that pays out a portable type information medium associated with balance information representing a balance of a game value according to a result of the game, and a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to the information processing device, and the information processing device includes a history information storage device that stores the information medium identification information, the insertion information associated with the information medium identification information, the game information, the balance information, and the gaming machine identification information as history information unique to the information medium, and a determination device that determines a game dependent state of a player based upon the history information.

According to such configuration, the game history of the player is associated with the information medium paid out from the terminal device, whereby it is possible to determine the game dependent state from the game history even against a non-registered player.

According to the above-described configuration of the information management system of the present invention, the terminal device includes an information reader capable of reading out first game value information imparted on the condition of exchange with a monetary value and usable for playing the game, and reading out second game value information imparted under a specific condition and usable for playing the game from the information medium, and provides the read game value information to the game.

According to such configuration, even though the balance of the first game value information runs out, when the balance of the second game value information remains, the information medium is continuously used, such that it is possible to determine the game dependent state based upon the game history associated with the information medium.

According to the above-described configuration of the information management system of the present invention, the determination device determines as the game dependent state based upon a history of the insertion information when the number of times of game value insertions in a predetermined period exceeds a predetermined value.

According to such configuration, the game dependency can be determined based upon a characteristic that the game dependency is higher as the number of times of game value insertions increases. For example, when it is recognized that the number of times of game value insertions exceeds a fixed number of times in the game behavior of one day, it is possible to determine the game dependent state where the game cannot be stopped halfway.

According to the above-described configuration of the information management system of the present invention, when the information medium is inserted at the start of the game, the information medium payout device associates the inserted information medium and the balance information and pays out the information medium.

According to such configuration, every time a player plays a game on a plurality of gaming machines, a game history of a specific non-registered player is associated with the same information medium, whereby the game dependency can be determined from the game history of the plurality of gaming machines of the player.

According to the above-described configuration of the information management system of the present invention, the balance information is information to be written to the information medium.

According to such configuration, the balance information is written to the paid-out information medium, whereby the balance can be used for playing a game in another gaming machine by inserting the information medium into the aforementioned another gaming machine.

According to the above-described configuration of the information management system of the present invention, the information processing device includes a database in which identification information of the information medium and personal information of the player are associated with each other and stored, as the information medium, there are a first information medium associated with the specific personal information and a second information medium in which the associated personal information does not exist, and the information medium payout device pays out the second information medium as a non-member information medium.

According to such configuration, even against a player who is not registered as a member, it is possible to grasp his or her gaming behavior and determine the game dependent state.

According to the above-described configuration of the information management system of the present invention, the transmission device transmits human body information acquired by a human body information acquisition device that acquires the human body information of the player in association with the information medium identification information, and the information processing device stores the human body information associated with the information medium identification information in the database, and collects the presence of the information medium associated with the same human body information.

According to such configuration, even though a player who is not registered as a member uses a plurality of information cards, the association therebetween can be performed to grasp his or her game behavior.

An information management system of the present invention includes: a gaming machine capable of playing a game according to an inserted game value; and an information processing device capable of communicating with the gaming machine, in which the gaming machine includes an information medium payout device that pays out a portable type information medium associated with balance information representing a balance of a game value according to a result of the game, and a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to the information processing device, and the information processing device includes a history information storage device that stores the information medium identification information, the insertion information associated with the information medium identification information, the game information, the balance information, and the gaming machine identification information as history information unique to the information medium, and a determination device that determines a game dependent state of a player based upon the history information.

According to such configuration, a game history of a player is associated with the information medium paid out in the gaming machine, whereby it is possible to determine the game dependent state from the game history thereof even against a non-registered player.

A terminal device of the present invention communicably connected to a gaming machine capable of playing a game according to an inserted game value, the device including: an information medium payout device that pays out a portable type information medium associated with balance information representing a balance of a game value according to a result of the game; and a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to outside.

According to such configuration, a game history of a player is associated with the paid-out information medium and then the game history thereof is transmitted, whereby it is possible to determine the game dependence state from the game history even against a non-registered player in an external transmission destination device.

According to the above-described configuration, the terminal device of the present invention is capable of reading out first game value information imparted on the condition of exchange with a monetary value and usable for playing the game, and reading out second game value information imparted under a specific condition and usable for playing the game from the information medium, and provides the read game value information to the game.

According to such configuration, even though the balance of the first game value information runs out, since the information medium is continuously used when the balance of the second game value information remains, it is possible to determine the game dependent state based upon the game history associated with the information medium.

According to the present invention, it is possible to prevent a player from being addicted to a game even against a non-registered player.

BRIEF DESCRIPTION OF THE DRAWINGS

FIGS. 9A and 9B are diagrams illustrating history information stored in the slot machine according to the embodiment of the present invention;

FIG. 10 is a diagram illustrating history information stored in a database of the information processing device according to the embodiment of the present invention;

DETAILED DESCRIPTION OF THE PREFERRED EMBODIMENT

[Overall Configuration of Information Management System]

Figure 1A:
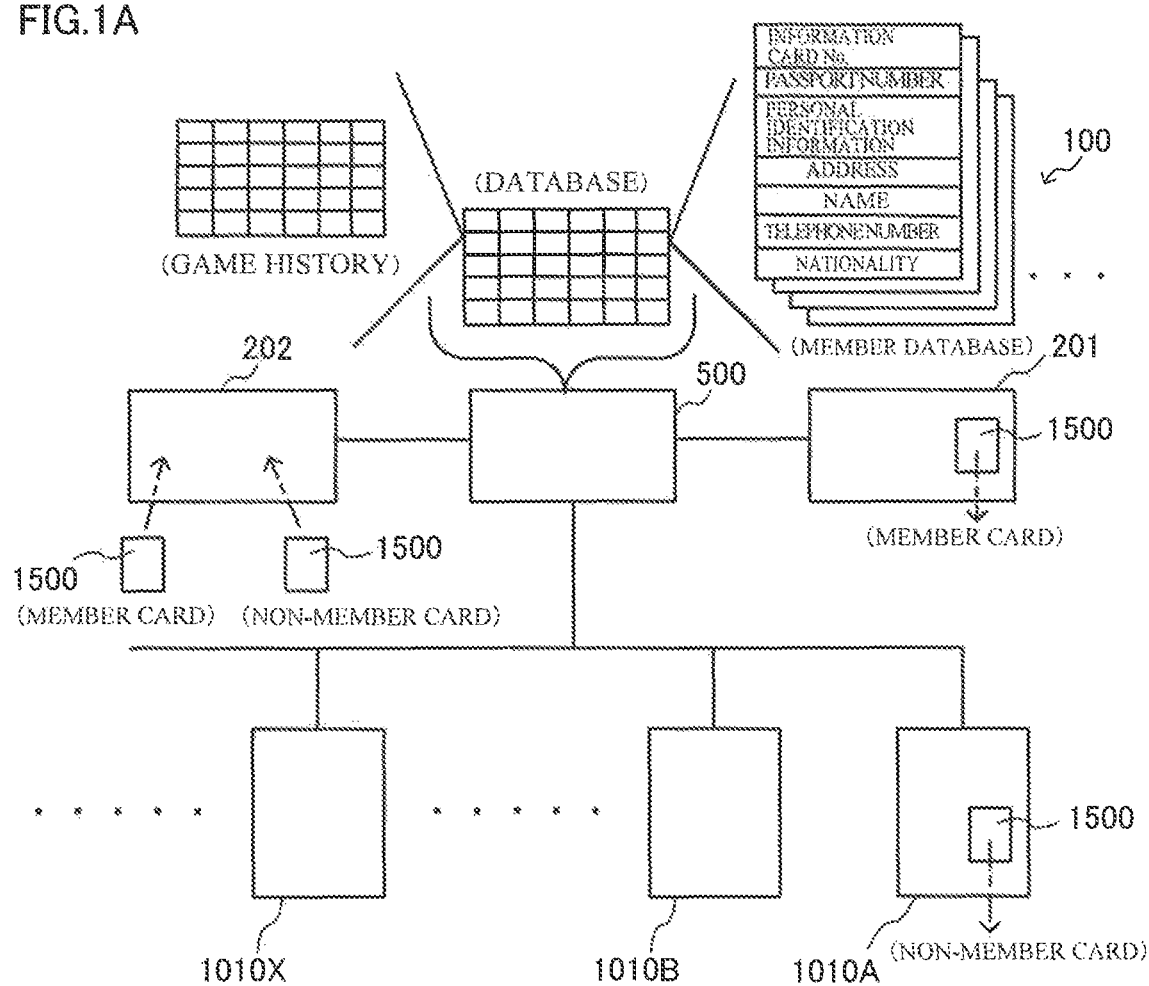
FIGS. 1A and 1B are diagrams illustrating an overall configuration of an information management system and a configuration of an information processing device according to an embodiment of the present invention.
Figure 1B:
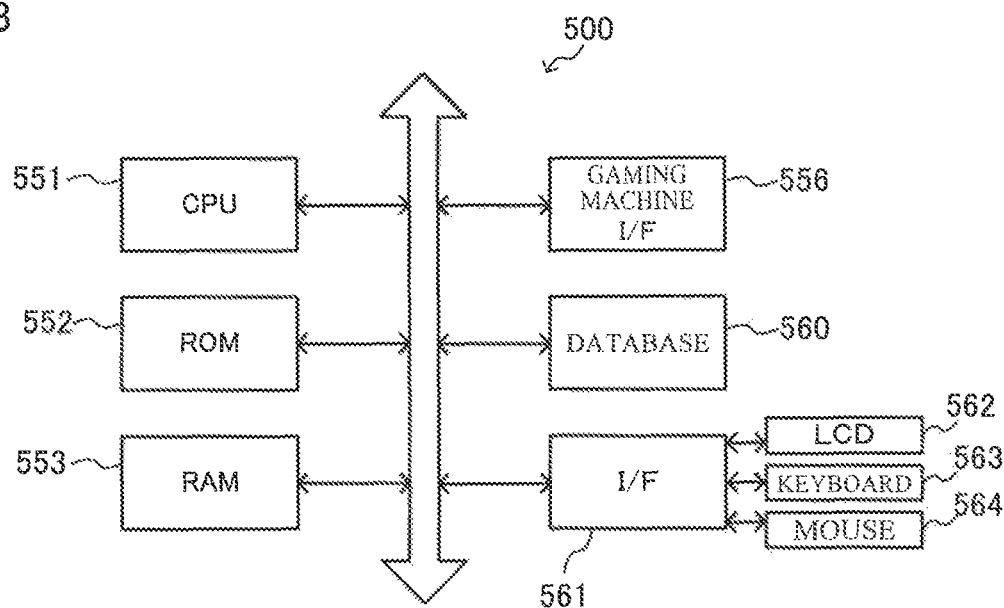

FIG. 1A is a block diagram illustrating an information management system 100 according to an embodiment of the present invention. As illustrated in FIGS. 1A and 1B, the information management system 100 is formed of a plurality of gaming machines (for example, slot machines 1010A, 1010B, and the like) installed in a game hall such as, for example, a casino, and the like and an information processing device 500 communicably connected thereto in a bidirectional manner. In the embodiment, the communication between the slot machines 1010A, 1010B, and the like and the information processing device 500 is performed by a PTS terminal 1700 provided in each of the slot machines 1010A, 1010B, and the like, but the slot machines 1010A, 1010B, and the like may directly communicate with the information processing device 500.

A member information card issuing device 201 is connected to the information processing device 500, and an IC card 1500 is configured to be issued as a member information card in the member information card issuing device 201. In the member information card, unique information card identification information (information card number (No)) for specifying the IC card 1500 is stored, and in the information processing device 500, member information is stored in a member database in association with each information card number. A player who becomes a member registers personal information (for example, name, address, telephone number, nationality, passport number, personal identification information for identifying an individual issued by a government, and the like) in the member database as the member information, such that in the member database, the personal information is registered in association with the information card identification information (information card number) for specifying the information card.

The information card to which the information card number is imparted is issued from the member information card issuing device 201, and the issued information card is used when a player registered as a member plays a game in the slot machines 1010A, 1010B, and the like.

A cashier 202 for performing cash conversion based upon the IC card 1500 (member information card or non-member information card) is connected to the information processing device 500. After the game, a player playing a game by using the IC card 1500 as the member information card or the non-member information card (described later) inserts the IC card 1500 paid out from the slot machines 1010A, 1010B, and the like into a card reader of the cashier 202, such that a currency corresponding to the balance owned by the player associated with the information card identification information (information card number) of the IC card 1500 is paid out to the player. In the embodiment, information on the balance associated with the information card (IC card) is written directly to the IC card 1500, but the present invention is not limited thereto. For example, the information processing device 500 may store the balance information in association with the information card number. Here, the balance information stored in the memory of the information processing device 500 may be read out corresponding to the card number of the IC card 1500 read by the card reader of the cashier 202, after which the currency may be paid back based upon the read balance information.

In the case of the non-member information card (IC card 1500), a player who is not registered as a member first inserts a currency into any one of the slot machines 1010A, 1010B, and the like to play a game, after which a dividend provided to the player as a result of the game and an amount corresponding to the number of credits remaining after making a BET with respect to an inserted amount are written thereto, and the non-member information card is newly paid out from any one of the slot machines 1010A, 1010B, and the like in which the play is performed. The player inserts the newly paid-out non-member information card (IC card 1500) into other slot machines 1010A, 1010B, and the like, whereby a new game can be played by using the number of credits corresponding to the balance information written to the non-member information card. When the non-member information card (IC card 1500) is inserted into the slot machines 1010A, 1010B, and the like and thus a game is played, a game value (corresponding to a currency amount, credit number, and the like) based upon the number of credits such as a dividend given as a result of the game play is written to the non-member information card (IC card 1500) inserted into the slot machines 1010A, 1010B, and the like when the game is played. That is, the balance information of the non-member information card is updated and the non-member information card is paid out. Accordingly, a player who is not registered as a member can play a game in the plurality of slot machines 1010A, 1010B, and the like while using the one non-member information card.

Even when the inserted IC card 1500 is the member information card issued to the player registered as the member, the balance information is updated and paid out with respect to the inserted member information card in the same manner as that of the non-member information card.

FIG. 1B is a block diagram illustrating a configuration of the information processing device 500. As illustrated in FIG. 1B, the information processing device 500 includes a configuration in which a central processing unit (CPU) 551, a read only memory (ROM) 552, a random access memory (RAM) 553, a gaming machine I/F 556, a database 560, an I/F 561, a liquid crystal display (LCD) 562, a keyboard 563, a mouse 564, and the like are connected to a bus. In the database 560, the member information associated with the information card number, the balance information and the game history information associated with the IC card 1500 issued to the member, and the balance information and the game history information associated with the IC card 1500 issued to the non-member, and the like are stored.

[Overall Configuration of Slot Machine]

Figure 2:
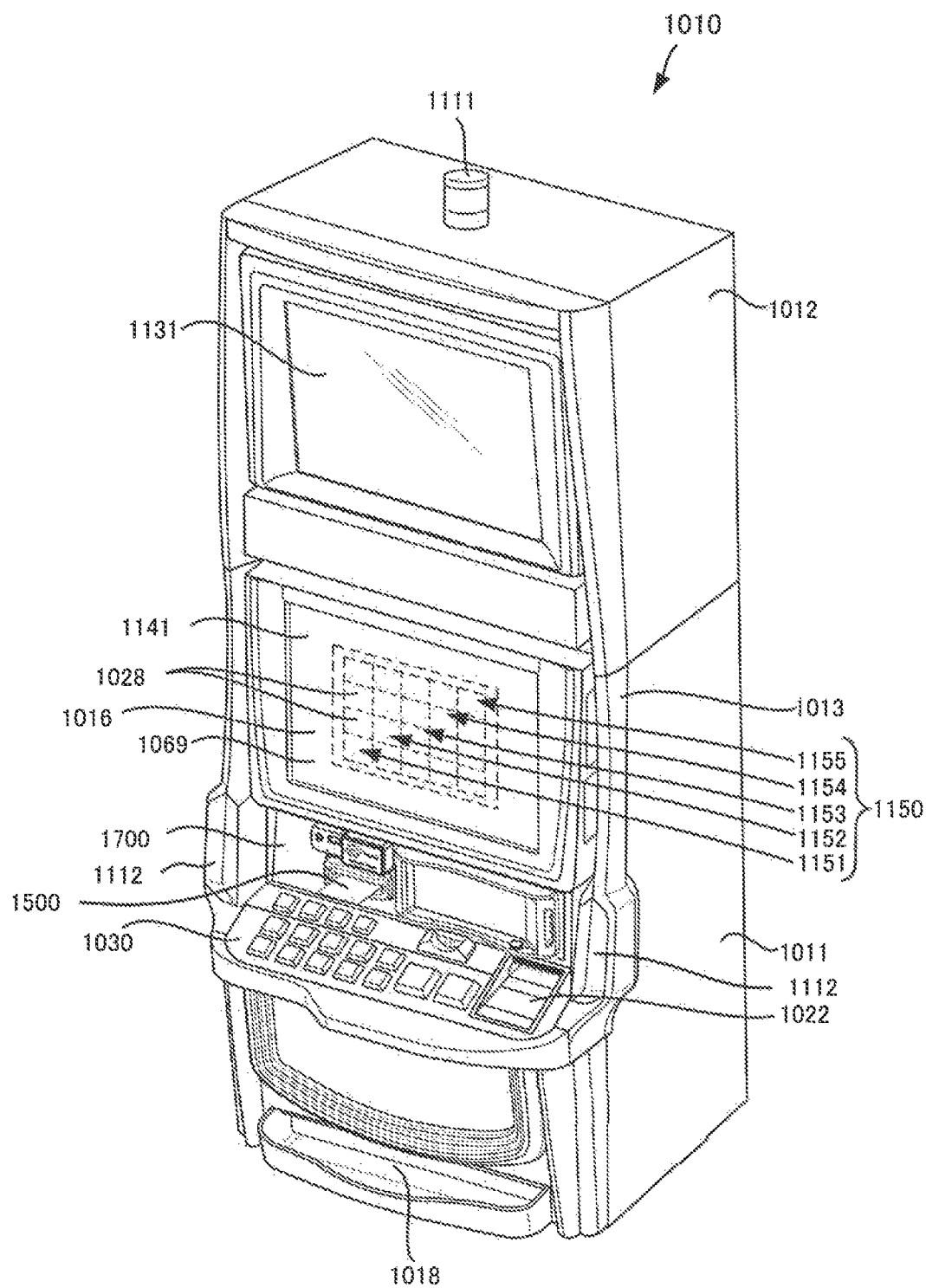
FIG. 2 is a perspective view illustrating a configuration of a slot machine according to an embodiment of the present invention.

Next, an overall configuration of the slot machine 1010 will be described with reference to FIG. 2.

In the slot machine 1010, as a game medium, the member information card (IC card 1500), the non-member information card (IC card 1500), and a bill or electronic valuable information corresponding to the game values thereof are used. Particularly, in the embodiment, credit related data such as cash data stored in the member information card or the non-member information card (hereinafter referred to as the IC card 1500) is used.

The slot machine 1010 includes a cabinet 1011, a top box 1012 installed on the upper side of the cabinet 1011, and a main door 1013 provided on the front surface of the cabinet 1011.

The main door 1013 includes a symbol display device 1016 referred to as a lower image display panel 1141. The symbol display device 1016 is formed of a transparent liquid crystal panel. In the screen on which the symbol display device 1016 is displayed, a display window 1150 is provided in a central part thereof. The display window 1150 is formed of 20 pieces of display blocks 1028 in five columns and four rows. The four pieces of display blocks 1028 in each column form pseudo reels 1151 to 1155 and are rotated according to an operation of a player. Each of the pseudo reels 1151 to 1155 can be rearranged in such a manner that the four pieces of display blocks 1028 are moved and displayed in a downward direction while changing the speed as a whole such that a symbol 1501 displayed on each of the display blocks 1028 is rotated in a vertical direction and then is stopped.

Here, the "rearranged" indicates a state in which the symbol 1501 is arranged again after the arrangement of the symbol 1501 is released. The "arrangement" indicates that the symbol 1501 is in a state of being visually confirmable by a player. The slot machine 1010 executes a so-called slot game in which a dividend corresponding to a winning combination is provided depending on the arrangement state of the symbol 1501 based upon the stop state of the rotating pseudo reels 1151 to 1155.

In the embodiment, it is described that the slot machine 1010 is a so-called video slot machine, but the slot machine 1010 of the present invention may adopt a so-called mechanical reel or may be substituted for some of the pseudo reels 1151 to 1155.

A touch panel 1069 is provided on the front surface of the symbol display device 1016, and a player can input various instructions by operating the touch panel 1069. An input signal is transmitted from the touch panel 1069 to a main CPU 1071.

An upper image display panel 1131 is provided on the front surface of the top box 1012. The upper image display panel 1131 is formed of a liquid crystal panel and forms a display. The upper image display panel 1131 displays an image relating to a performance, an image showing an introduction of the contents of the game and the description of a rule. The top box 1012 is provided with a lamp 1111.

A number-of-credits display part (not illustrated) is displayed at the upper part of the display window 1150, and the current number of credits is displayed thereon. Here, the "credit" is a virtual game medium on a game used when a player makes a BET. The total number of credits currently owned by the player is displayed on the number-of-credits display part.

A fractional cash display part (not illustrated) is displayed at the lower part of the number-of-credits display part. The fractional cash display part displays fractional cash. The "fractional cash" indicates cash that is not converted into the credit because the inserted amount is not sufficient.

The IC card 1500 is inserted into a PTS terminal 1700 which will be described later; the number of credits stored in the IC card is displayed on the number-of-credits display part; and the fractional cash stored in the IC card is displayed on the fractional cash display part. These numerical values are stored in a member management server (not illustrated) in association with an identification code of the member card.

Here, the IC card is a non-contact IC card and incorporates an integrated circuit (IC) for recording and computing various data such as a credit, and the like, and is capable of performing, for example, short-range radio communication using radio frequency identification (RFID) technology such as near field communication (NFC). The player can own the credit related data by using the IC card 1500 and can freely carry the IC card 1500 between different slot machines. Then, the IC card 1500 is inserted into the PTS terminal 1700 of the slot machine 1010, whereby the player can play a game such as a unit game, and the like in the slot machine 1010 by using the credit related data (amount data) stored in the IC card 1500.

The player can store cash such as a coin and a bill in the IC card 1500 as cash data from a machine installed in the game hall.

At the lower part of the lower image display panel 1141, the PTS terminal 1700 is incorporated in the cabinet 1011. Speakers 1112 are respectively provided on the left and right sides of the PTS terminal 1700 and the lamp 1111 is provided at the upper part of the top box 1012. In the slot machine 1010, the performance of the unit game is executed by the display of an image by the upper image display panel 1131, the output of sound by the speaker 1112, and the output of light by the lamp 1111.

[Configuration of PTS Terminal]

Figure 3:
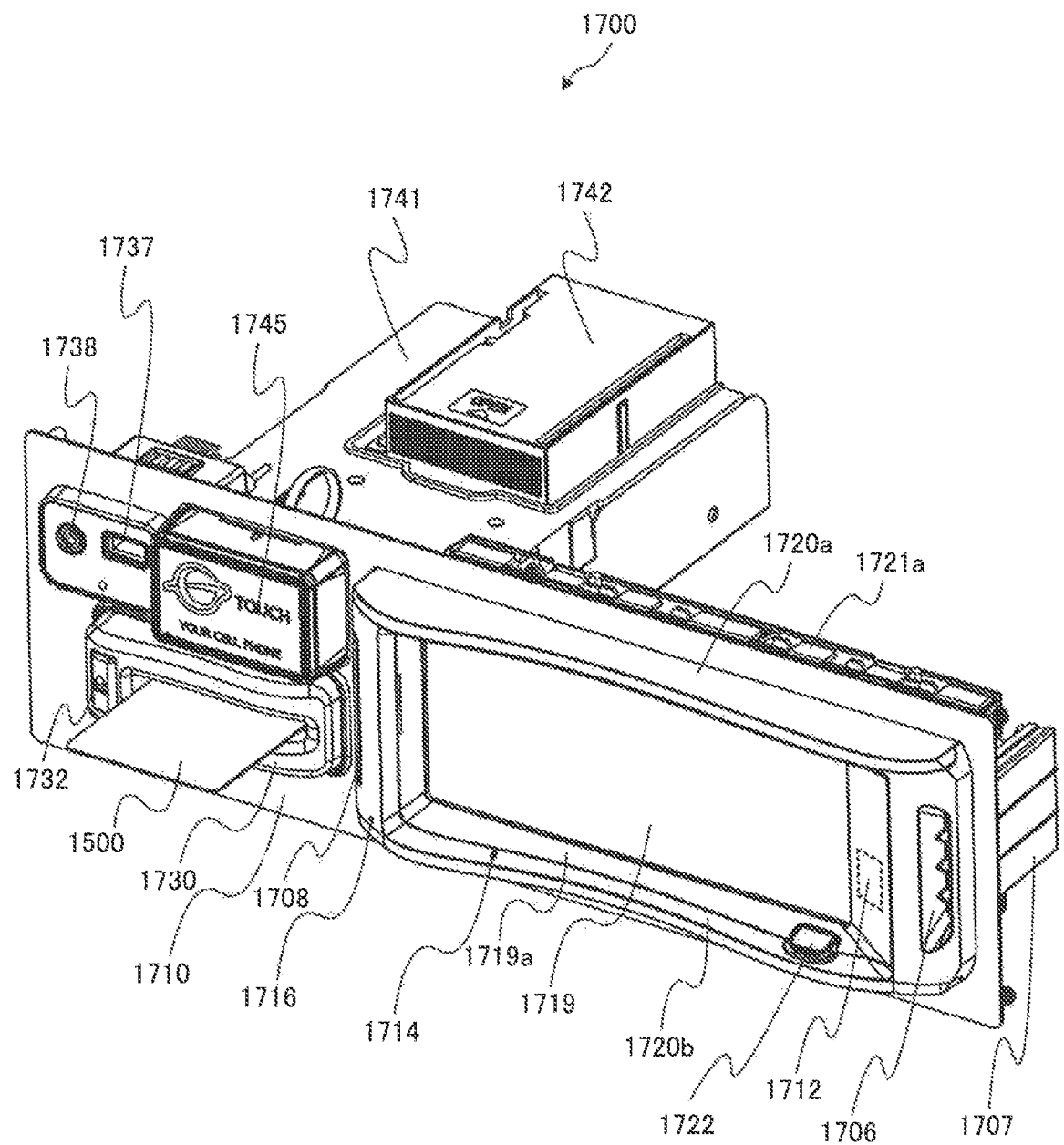
FIG. 3 is a perspective view illustrating a PTS terminal incorporated in the slot machine according to the embodiment of the present invention.

FIG. 3 is a diagram illustrating the PTS terminal 1700 incorporated in the slot machine 1010. The PTS terminal 1700 can be incorporated into various types of gaming machines of various manufacturers by performing data exchange by using a data interface common between the gaming machines.

The PTS terminal 1700 includes a panel 1710; each part disposed on the front surface of the panel 1710 is visually recognized by the player; and a member disposed on the rear surface of the panel 1710 is stored inside the slot machine 1010 such that the member cannot be seen by the player.

An LCD 1719 including a touch panel function is provided on the right side of the front surface of the panel 1710. The LCD 1719 displays, for example, information on the member and information for the member, and a screen size is 6.2 inches (about 15.7 cm). An LCD cover 1719a is provided around the LCD 1719. In the embodiment, the LCD 1719 is configured to include the touch panel function, but the instruction of the player may be inputted by another input device such as a keyboard and a mouse.

A light emitting plate 1720a connected to the LED and emitting light is provided above the LCD 1719 and an LCD cover 1719a. The light emitting plate 1720a is formed of, for example, polycarbonate, is connected to a plurality of (for example, seven pieces of) full color LEDs 1721a disposed on the back side of the panel 1710, and emits light in response to the light emission of the full color LED 1721*a*.

A light emitting plate 1720*b* connected to the LED and emitting light is provided below the LCD 1719 and the LCD cover 1719*a* in the same manner. The light emitting plate 1720*b* is formed of, for example, polycarbonate, is connected to a plurality of (for example, seven pieces of) full color LEDs 1721*b* (not illustrated) disposed on the back side of the panel 1710, and emits light in response to the light emission of the full color LEDs 1721*b*.

The full color LED 1721*a* (light emitting plate 1720*a*) and the full color LED 1721*b* (light emitting plate 1720*b*) are configured to be capable of performing light emission contributing to the prevention of addiction.

An imaging window 1712 is provided on the right side of the LCD 1719. A human body detection camera 1713 (refer to FIG. 5) disposed inside the LCD cover 1719*a* or on the back side of the panel 1710 captures an image of a player, and the like through the imaging window 1712. The imaging window 1712 may be, for example, a half mirror material to which shield processing such as smoke, and the like is applied.

A home button 1722 is provided on the LCD cover 1719*a* at the lower right of the LCD 1719. The home button 1722 is a button for causing the screen displayed on the LCD 1719 to be shifted to a predetermined upper screen.

A speaker duct 1706 is provided on the LCD cover 1719*a* on the right side of the LCD 1719, and a bass reflex (bass reflex type) speaker 1707 is provided at a position on the back side of the panel 1710 corresponding thereto. In the same manner, a speaker duct 1708 is provided on the left side of the LCD 1719, and a bass reflex (bass reflex type) speaker 1709 (refer to FIG. 5) is provided at a position on the back side of the panel 1710 corresponding thereto. The speakers are dedicated speakers of the PTS terminal 1700, and are provided separately from the speaker for the slot machine game provided in the slot machine 1010. The speakers can realize an interlocking performance and communication by a voice, output a notification sound caused by forgetting to remove the IC card 1500, and output a sound or a voice contributing to the prevention of addiction. Since the sound from the speaker is configured to be heard in stereo on the front side (on the player side) via the above-described speaker ducts 1706 and 1708, the speaker can be installed on the back side of the panel 1710, and as a result, the space saving (of the panel surface) of the PTS terminal 1700 is realized.

A microphone opening part 1714 and a microphone opening part 1716 are provided on the LCD cover 1719*a* at the lower left of the LCD 1719, and microphones 1715 and 1717 (refer to FIG. 5) are respectively provided inside the LCD cover 1719*a* corresponding thereto.

A card insertion slot 1730 into and from which the IC card 1500 can be inserted and removed is provided at the lower left and front surface of the panel 1710. A card insertion part of the card insertion slot 1730 is provided with a full color LED 1731 (refer to FIG. 5), and it is possible to notify the remaining number of IC cards 1500 accumulated in a card stacker 1742 which will be described later by lighting in a plurality of colors. The card insertion slot 1730 is provided with an eject button 1732, and a red LED 1733 (refer to FIG. 5) provided near the eject button 1732 is turned on so that a position of the eject button 1732 and processing of an eject operation can be understood.

A card unit 1741 and a card stacker 1742 are provided at a position on the back side of the panel 1710 corresponding to the card insertion slot 1730, and the card insertion slot 1730 is configured as a part of the card unit 1741. About 30 pieces of IC cards 1500 can be stored in the card stacker 1742, and when a non-member player who newly plays a unit game settles a credit, the IC card 1500 stored in the card stacker 1742 is taken out and discharged to the card insertion slot 1730 as the non-member information card. That is, when the game is played with a currency inserted into a bill validator 1022 without inserting the IC card 1500 from the card insertion slot 1730, the IC card 1500 is discharged from the card insertion slot 1730 as the non-member information card in a state of being not associated with the personal information of the member database.

On the other hand, when the member information card (IC card 1500) associated with the personal information of the player in advance is inserted from the card insertion slot 1730, or when the non-member information card (IC card 1500) which is not associated with the personal information is inserted from the card insertion slot 1730, the inserted IC card 1500 is held in the card unit 1741, and information such as the balance information which is a result of the game in the slot machine 1010 is written to the held IC card 1500 when the card is discharged.

The member information card or the non-member information card (IC card 1500) held in the card unit 1741 updates credit information by NFC, and the like at the time of settlement of the credit, after which the IC card 1500 is discharged from the card insertion slot 1730. The IC card 1500 is completely stored inside the card unit 1741 while the player plays the unit game.

When the absence of the player is detected by a human body detection camera, and the like even though the IC card 1500 remains at the time of the settlement of the credit, the IC card 1500 can be configured to be stored in the card stacker 1742. Accordingly, for example, when the player leaves the IC card 1500 and leaves his or her seat after knowing that the remaining credit is low, or even when the player simply forgets to take the IC card 1500 and leaves the seat, the IC card 1500 does not remain held in the card unit 1741 for a long time.

A USB terminal 1737 and an audio terminal 1738 are provided on the front upper left side of the panel 1710. The USB terminal 1737 is configured to perform charging, and the like by connecting a USB device to the USB terminal 1737. The audio terminal 1738 is, for example, a four-pole terminal, and a headset is inserted thereinto, such that the user can talk to the other party with a headphone and a microphone. The audio terminal 1738 is configured as a two-pole or a three-pole terminal such that the user also can listen to the sound with the headphone.

A touch unit 1745 is provided on the front surface of the panel 1710 and on the left side of the LCD 1719. The touch unit 1745 includes: a writer that writes data by data communication to an IC device including an IC chip (for example, a non-contact IC card and a mobile phone and a smart phone provided with a communication function by NFC); and an RFID module that can function as a reader that reads the data from the IC device by the data communication. LEDs 1746 (not illustrated) are respectively disposed at four corners of the front surface of the touch unit 1745. In addition to the touch unit 1745, or in place of the touch unit 1745, an information recording medium reader for reading information stored in an information recording medium such as a magnetic card may be provided. Here, the magnetic card can be used as a member card instead of the IC card 1500.

As described above, in the PTS terminal 1700 according to the embodiment of the present invention, various devices including a microphone function, a camera function, a speaker function, a display function, and the like are integrated to form one unit, thereby achieving space saving. Accordingly, for example, when the LCD is directed toward the player in a state where each of the functions are installed as a single part, there is no inconvenience that the speaker cannot be installed toward the player.

In the PTS terminal 1700 according to the embodiment of the present invention, when the IC card 1500 is inserted into the card insertion slot 1730, the content of the IC card 1500 is configured to be read by the card unit 1741 and the entire IC card 1500 is configured to be taken in and held (inside the PTS terminal 1700), however, in addition thereto, the touch unit 1745 is provided, thereby making it possible to further perform the data communication with another IC card, a mobile phone, and a smart phone.

According to the above-described configuration of the PTS terminal 1700 of the present invention, for example, when some kind of maintenance is required while a player who is a member plays a game on a gaming machine (here, the card unit 1741 holds the membership card), a staff touches the IC card for maintenance on the touch unit 1745, thereby making it possible to display a screen for maintenance on the LCD 1719 of the PTS terminal 1700 and to transmit and store a maintenance content and a history to the server.

When the maintenance of the plurality of gaming machines is performed at the same time or the maintenance of a large number of gaming machines is continuously performed, the cards for maintenance are sequentially touched on the touch unit 1745, thereby making it possible to quickly perform operations such as displaying the screen for maintenance and registering the maintenance content.

On the other hand, in the PTS terminal 1700, in the case of a configuration in which only the touch unit 1745 can access the IC card, even though a first player who plays a game by touching the IC card 1500 thereon leaves a gaming machine and then another player uses the gaming machine, the gaming machine cannot recognize the replacement of the player. In order to solve such inconvenience, the card unit 1741 which holds the IC card 1500 while playing the game is desirable. For example, when a first player who plays a game by touching the IC card 1500 leaves a gaming machine and then another player inserts a bill (without using the IC card) to play a game on the gaming machine and performs the settlement, the credit related data are stored in the IC card 1500 of the first player.

[Circuit Configuration of Slot Machine]

Figure 4:
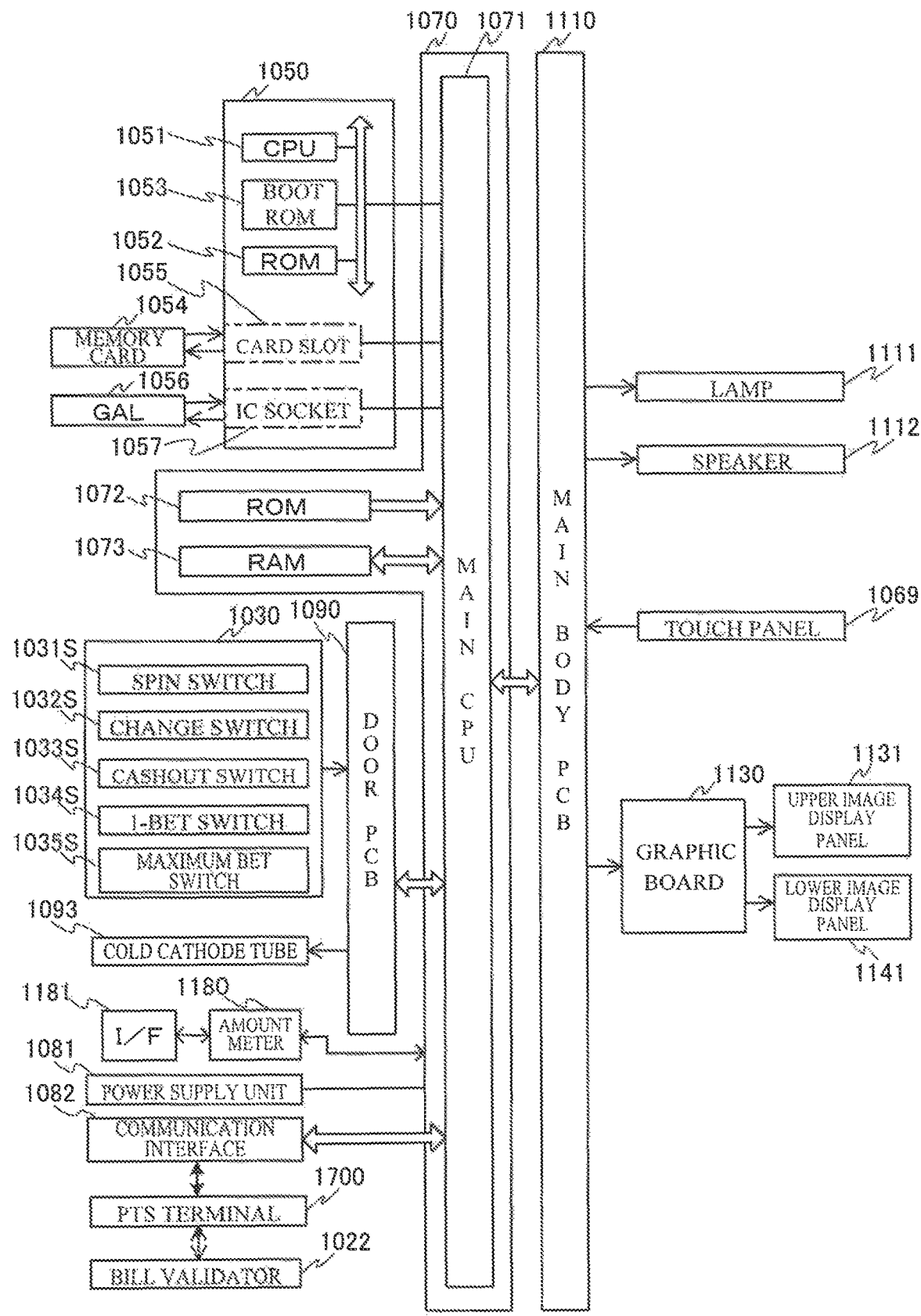
FIG. 4 is a block diagram illustrating a configuration of the slot machine according to the embodiment of the present invention.

Next, a configuration of a circuit provided in the slot machine 1010 will be described with reference to FIG. 4.

A gaming board 1050 includes a CPU 1051, a ROM 1052, and a boot ROM 1053 which are connected to each other by an internal bus, a card slot 1055 corresponding to a memory card 1054, and an IC socket 1057 corresponding to a generic array logic (GAL) 1056.

The memory card 1054 is formed of a non-volatile memory and stores a game program and a game system program. The game program includes a program related to the progress of the game and a program for executing a performance (notification) by an image or a sound. The game program includes a symbol determination program. The symbol determination program is a program for determining a symbol to be rearranged in the display block 1028.

The card slot 1055 is configured so that the memory card 1054 can be inserted and removed, and is connected to a mother board 1070 by an IDE bus. Therefore, the memory card 1054 is removed from the card slot 1055; another game program is written to the memory card 1054; and the memory card 1054 is inserted into the card slot 1055, whereby the type and content of the game performed by the slot machine 1010 can be changed.

The GAL 1056 is a type of a programmable logic device (PLD) including an OR fixed-type array structure. The GAL 1056 includes a plurality of input ports and output ports, and outputs corresponding data from the output port when the input port receives a predetermined input.

The IC socket 1057 is configured so that the GAL 1056 can be attached and detached, and is connected to the mother board 1070 by a PCI bus. The content of the game performed by the slot machine 1010 can be changed by replacing the memory card 1054 with one into which another program is written, or by rewriting the program written to the memory card 1054 into another program.

The CPU 1051, the ROM 1052, and the boot ROM 1053 connected to each other by the internal bus are connected to the mother board 1070 by the PCI bus. The PCI bus transmits a signal between the mother board 1070 and the gaming board 1050, and supplies power from the mother board 1070 to the gaming board 1050.

An authentication program is stored in the ROM 1052. The boot ROM 1053 stores a preliminary authentication program and a program (boot code) for activating the preliminary authentication program by the CPU 1051.

The authentication program is a program (falsification check program) for authenticating the game program and the game system program. The preliminary authentication program is a program for authenticating the authentication program. The authentication program and the preliminary authentication program are described according to a procedure (authentication procedure) for authenticating that a target program is not falsified.

The mother board 1070 is configured by using a general-purpose mother board available on the market (a printed wiring board on which a basic component of a personal computer is mounted), and includes a main CPU 1071, a ROM 1072, a RAM 1073, and a communication interface 1082.

The ROM 1072 is formed of a memory device such as a flash memory, and the like, and stores a program such as a basic input/output system (BIOS) executed by the main CPU 1071 and permanent data. When the BIOS is executed by the main CPU 1071, predetermined initialization processing of a peripheral device is performed. Fetching processing of the game program and the game system program stored in the memory card 1054 is started via the gaming board 1050. In the present invention, the ROM 1072 may be one whose content can be rewritten or cannot be rewritten.

The RAM 1073 stores data used when the main CPU 1071 operates and a program such as the symbol determination program, and the like. For example, when the fetching processing of the game program, the game system program, and the authentication program is performed, these can be stored. The RAM 1073 is provided with a work area when the program is executed. For example, an area for storing a counter that manages the number of games, the number of BETs, the number of payouts, the number of credits, and the like, and an area for storing a symbol (code number) determined by lottery are provided therein.

The communication interface 1082 is configured to control transmission and reception of data with the PTS terminal 1700. A door printed circuit board (PCB) 1090 and a main body PCB 1110 which will be described later are respectively connected to the mother board 1070 by a USB. A power supply unit 1081 is connected to the mother board 1070.

When power is supplied form the power supply unit 1081 to the mother board 1070, the main CPU 1071 of the mother board 1070 is activated, and the power is supplied to the gaming board 1050 via the PCI bus, thereby activating the CPU 1051.

An input device such as a switch and a sensor and a peripheral device whose operation is controlled by the main CPU 1071 are connected to the door PCB 1090 and the main body PCB 1110.

A control panel 1030 and a cold cathode tube 1093 are connected to the door PCB 1090.

The control panel 1030 is provided with a spin switch 10315, a change switch 1032S, a CASHOUT switch 1033S, a 1-BET switch 1034S, and a maximum BET switch 1035S corresponding to the above-described respective buttons. Each switch detects that a corresponding button is pressed by a player, and outputs a signal to the main CPU 1071.

The cold-cathode tube 1093 functions as a backlight installed on the back sides of the upper image display panel 1131 and the lower image display panel 1141, and is turned on based upon a control signal outputted from the main CPU 1071.

The lamp 1111, the speaker 1112, the touch panel 1069, and a graphic board 1130 are connected to the main body PCB 1110. The bill validator 1022 is connected to the PTS terminal 1700 in the present example, but may be configured to be connected to the slot machine 1010.

The lamp 1111 is turned on based upon a control signal outputted from the main CPU 1071. The speaker 1112 outputs a sound such as BGM, and the like based upon the control signal outputted from the main CPU 1071.

The touch panel 1069 detects a position where a finger of a player touches on the lower image display panel 1141, and outputs a signal corresponding to the detected position to the main CPU 1071.

The bill validator 1022 is a device for validating the propriety of a bill and for receiving and inputting a legitimate bill into the cabinet 1011. Then, the bill inputted into the cabinet 1011 is converted into a credit, and the converted credit is added as a credit owned by a player.

The graphic board 1130 controls the display of the images respectively performed by the upper image display panel 1131 and the lower image display panel 1141 based upon the control signal outputted from the main CPU 1071. The graphic board 1130 includes a video display processor (VDP) for generating image data and a video RAM for storing the image data generated by the VDP. The image data used when generating the image data by the VDP are read from the memory card 1054 and included in the game program stored in the RAM 1073.

The graphic board 1130 includes the VDP for generating the image data based upon the control signal outputted from the main CPU 1071 and the video RAM for temporarily storing the image data generated by the VDP. The image data used when generating the image data by the VDP are read from the memory card 1054 and included in the game program stored in the RAM 1073.

An amount meter 1180 stores an integrated value of the BET game value (cash, first point, second point (details will be described later)) at each game time and an integrated value of the amount of prize at each game time, and can output the integrated value thereof to outside via the output I/F 1181 as necessary. Each integrated value stored in the amount meter 1180 is outputted to the PTS terminal 1700 in response to a request from the PTS terminal 1700.

[Circuit Configuration of PTS Terminal]

Figure 5:
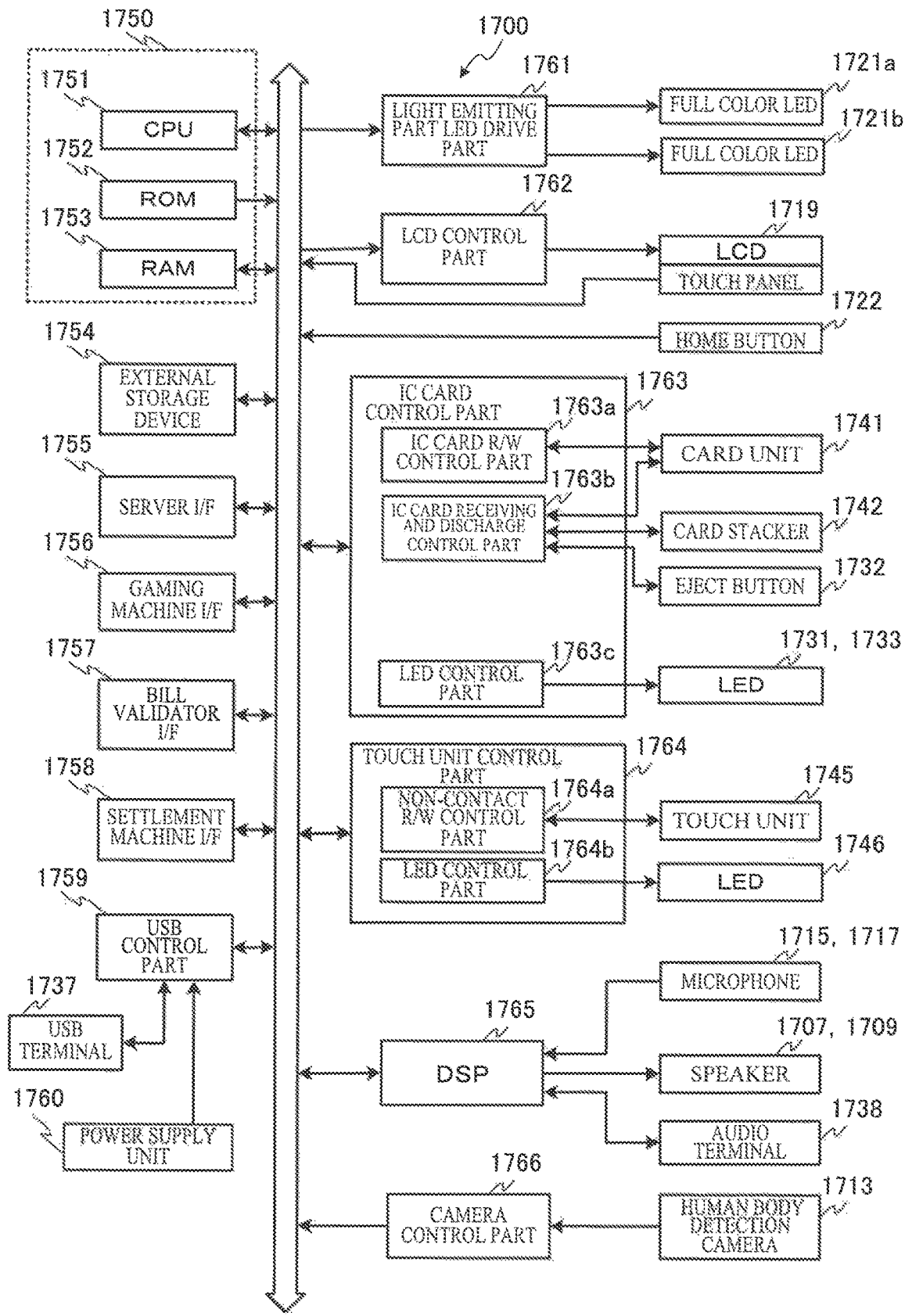
FIG. 5 is a block diagram illustrating a configuration of the PTS terminal according to the embodiment of the present invention.

Next, a configuration of a circuit provided in the PTS terminal 1700 will be described with reference to FIG. 5.

A PTS controller 1750 that controls the PTS terminal 1700 includes a CPU 1751, a ROM 1752, and a RAM 1753.

The CPU 1751 performs the execution control of each component of the PTS terminal 1700, and executes or computes various programs stored in the ROM 1752. For example, the CPU 1751 executes a credit update program to update the credit related data stored in the IC card 1500.

The ROM 1752 is formed of a memory device such as a flash memory, and the like, and stores permanent data to be executed by the CPU 1751. For example, the ROM 1752 stores the credit update program that rewrites the credit related data stored in the IC card 1500, an interlocking performance control program to be executed in response to a request from a bonus server (not illustrated), and a notification program to be executed in response to a request (notification information, and the like) from a hall management server.

The RAM 1753 temporarily stores data necessary when various programs stored in the ROM 1752 are executed.

An external storage device 1754 is, for example, a storage device such as a hard disk device, and stores a program to be executed by the CPU 1751 and data used by the program to be executed by the CPU 1751.

A server I/F (interface) 1755 implements data communication between a server such as the information processing device 500, the bonus server (not illustrated), and the like and the PTS terminal 1700. A gaming machine I/F (interface) 1756 implements data communication between the mother board 1070 of the slot machine 1010 and the PTS terminal 1700 via the communication interface 1082 of the slot machine 1010, and a predetermined protocol may be used for the data communication.

The PTS terminal 1700 is connected to the bill validator 1022 via a bill validator I/F (interface) 1757 and connected to the cashier 202 (FIG. 1) via a settlement machine I/F (interface) 1758, and can transmit and receive data as necessary.

A USB control part 1759 determines whether to supply power from a power supply unit 1760 to the USB terminal 1737 and can charge the USB terminal 1737 when a predetermined condition is satisfied. The player can charge an electronic device by connecting the electronic device to the USB terminal 1737 when the predetermined condition is satisfied.

In order to cause the light emitting plate on the upper side of the LCD 1719 to emit light in response to a notification request from the hall management server, an interlocking performance start request from the bonus server (not illustrated), and the like, a light emitting part LED drive part 1761 controls the full color LED 1721a to be turned on at a predetermined timing, and in order to cause the light emitting plate on the lower side of the LCD 1719 to emit light, the light emitting part LED drive part 1761 controls the full color LED 1721b to be turned on at a predetermined timing.

An LCD control part 1762 is controlled so that information contributing to the prevention of addiction, member information, information for the member, and the like are displayed on the LCD 1719, and data read from the IC card 1500 and data inputted by the player are displayed. The LCD 1719 includes a touch panel function, and when the touch panel is operated by the player, a predetermined signal is transmitted to the CPU 1751.

A home button 1722 is provided near the LCD 1719 and is a button for shifting a screen displayed on the LCD 1719 to a predetermined upper screen. When the home button 1722 is pressed by the player, an operation of the player is transmitted to the CPU 1751, after which the CPU 1751 transmits a command to the LCD control part 1762 so as to update the display of the LCD 1719 according to the operation.

An IC card control part 1763 controls insertion and discharge of the IC card 1500, and writing of the credit data, and the like. The IC card control part 1763 includes an IC card reader and writer (R/W) control part 1763*a*, an IC card receiving and discharge control part 1763*b*, and an LED control part 1763*c*.

The IC card R/W control part 1763*a* controls the card unit 1741, thereby updating the credit related data stored in the IC card 1500. When the IC card 1500 is newly issued, the credit related data corresponding to the settled amount are stored. The card unit 1741 includes an antenna part for reading or writing data from or to the IC card 1500 by NFC, and the like.

The card unit 1741 includes functions of an IC card reader for reading the information stored in the IC card 1500 and of an IC card writer for writing the information to the IC card 1500, but may include either one of the above-described functions as necessary.

The IC card receiving and discharge control part 1763*b* controls receiving and discharge of the IC card 1500. When the IC card 1500 is inserted into the card insertion slot 1730 by a player, the IC card is controlled to be held in the card unit 1741 while the player executes a game. After the credit related data are written to the IC card 1500 at the time of settlement, the IC card 1500 is controlled to be discharged therefrom. When the eject button 1732 is pressed, the IC card 1500 is discharged.

When the IC card 1500 is newly issued, the IC card 1500 is newly taken out of the card stacker 1742, and then the IC card 1500 is supplied to the card unit 1741 in order to store the credit related data.

The LED control part 1763*c* is controlled so that the LED (full color LED 1731) provided near the card insertion slot 1730 of the card unit 1741 is turned on and the LED (red LED 1733) provided near the eject button 1732 is turned on.

A touch unit control part 1764 controls data transmission and reception according to a touch operation of the IC card 1500, a mobile phone, a smart phone, and the like. The touch unit control part 1764 includes a non-contact R/W (reader and writer) control part 1764*a* and an LED control part 1764*b*.

The non-contact R/W control part 1764*a* determines whether the IC card 1500 or the mobile phone approaches a predetermined distance (for example, a touch operation is performed) in the touch unit 1745, and when the IC card 1500 or the mobile phone approaches the predetermined distance, the non-contact R/W control part 1764*a* acquires a reading result, and the like from the touch unit 1745. The touch unit 1745 includes an antenna part for transmitting and receiving data to and from the IC card 1500 and the mobile phone by NFC, and the like.

The touch unit 1745 includes functions of an IC card reader for reading information stored in the IC card 1500 and the mobile phone, and an IC card writer for writing information to the IC card 1500 and the mobile phone, but may include either one of the above-described functions as necessary.

The LED control part 1764*b* controls the LEDs 1746 disposed at four corners of the front surface of the touch unit 1745 and lights the LEDs 1746 at a predetermined timing.

A DSP 1765 receives voice data acquired from microphones 1715 and 1717, performs predetermined voice processing, and transmits the voice data to the CPU 1751. The DSP 1765 transmits the received voice data to speakers 1707 and 1709. The DSP 1765 outputs the received voice to the headphone with respect to the audio terminal connected to the headset, processes the voice received from the microphone, and transmits the processed voice to the CPU 1751. Here, a schematic configuration is illustrated and an A/D converter, a D/A converter, an amplifier, and the like are omitted.

A camera control part 1766 acquires an image of a player, and the like captured by the human body detection camera 1713, performs predetermined image processing as necessary, and transmits the processed data to the CPU 1751. The data are transmitted to, for example, the hall management server (not illustrated), the member management server (not illustrated), and the like via the server I/F 1755.

The camera control part 1766 transmits imaging information captured by the human body detection camera 1713 to the information processing device 500, and the like in response to an instruction from the information processing device 500.

In the slot machine 1010 (PTS terminal 1700) of the embodiment, there are cash, points, and the like as game values which can be inserted to play a game. The cash is inserted into the bill validator 1022 of the PTS terminal 1700, after which information (cash insertion amount information) representing a type (cash) of the game value and an amount thereof is transmitted from the PTS terminal 1700 to the main CPU 1071 of the slot machine 1010. The main CPU 1071 stores the information received from the PTS terminal 1700 in a memory of the amount meter 1180 (FIG. 4). The point is read from the IC card inserted into the card unit 1741 of the PTS terminal 1700, and information (point insertion amount information) representing a type (first or second point) of the game value and an amount thereof is transmitted from the PTS terminal 1700 to the main CPU 1071 of the slot machine 1010. The main CPU 1071 stores the information received from the PTS terminal 1700 in the memory of the amount meter 1180. The point is a point distributed by a casino for promotion and a point cumulatively awarded for each fixed amount of the game play (for example, 5 dollars), and a player can use the aforementioned point in the slot machine 1010 (PTS terminal 1700) in a state where the point is cumulatively stored in his or her own IC card 1500 (non-member information card) and can use the point for various services other than playing the game, or can be awarded a preferential rank corresponding to the balance of the point, thereby obtaining a privilege close to a cash value. The point includes a limit point (first point) that can only be used for playing the game and an unlimited point (second point) that can be used other than playing the game (for example, usable for various services in the facility). The aforementioned points are stored in a distinguishable manner in the corresponding storage area of the IC card for each type of point (the first point is stored in a third storage area AR3 of the IC card 1500 (FIG. 6A) and the second point is stored in a fourth storage area AR4 of the IC card 1500 (FIG. 6A)). Therefore, when the IC card 1500 is inserted into the card unit 1741 of the slot machine 1010 (PTS terminal 1700), either one of the first and second points can be selectively used. The selection is configured to be selectable, for example, on the LCD touch panel 1719 of the PTS terminal 1700. In the present embodiment, both of the first and the second points cannot be treated as a cash equivalent, and in principle, cash conversion thereof cannot be performed.

After the player inserts the IC card 1500 (non-member information card) into the PTS terminal 1700 and plays the game in the slot machine 1010, a dividend given in the game play and a point given as a result of playing the game are written to the IC card 1500 (non-member information card) being inserted into the PTS terminal 1700 here. After the game play is finished, the IC card 1500 (non-member information card) is returned from the PTS terminal 1700 to the player.

[Circuit Configuration of IC Card]

Hereinafter, a circuit configuration of the IC card 1500 will be described with reference to FIG. 6 of the accompanying drawing. FIG. 6A is a block diagram illustrating a circuit configuration of the IC card 1500 according to an embodiment of the present invention. The IC card 1500 includes: an input and output part 1510 used as an interface for transmitting and receiving information to and from an information card reading part in a non-contact manner; a non-volatile storage part 1520 including a function as a storage device; and a control part 1530 including a function as a control device for controlling the input and output part 1510 and the non-volatile storage part 1520.

Figures 6A, 6B:
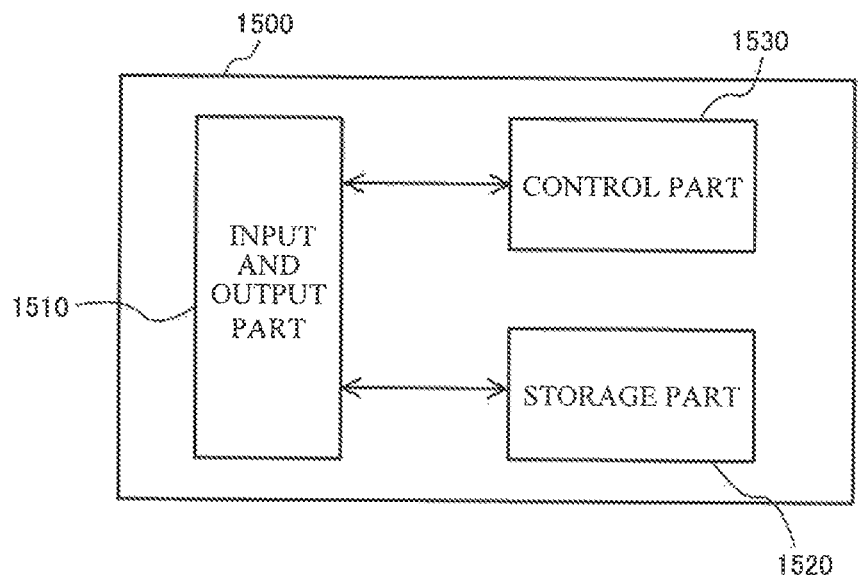
FIGS. 6A and 6B are schematic diagrams illustrating a configuration and a storage area of an IC card according to the embodiment of the present invention.

FIG. 6B is a conceptual diagram illustrating an area for storing four types of game value information provided in the storage part 1520 of the IC card 1500 by type. A first area is a first storage area AR1 for storing a game value corresponding to a deposit deposited for a player to participate in a specific service providing program (for example, a rolling program); the game value stored in the first storage area AR1 cannot be, in principle, converted into the cash in the cashier 202; and the game value stored therein is only permitted to be use in the game by the slot machine 1010 (there is a limitation in the use of the game value information). A prize money generated in the game in such a manner that first game value information is read from the first storage area AR1 and then is provided for the BET of the game is stored in a second storage area AR2. Information representing the amount of the game value stored in the first storage area AR1 is referred to as the first game value information.

A second area can store a game value corresponding to any amount of money deposited by a player in cash, and is the second storage area AR2 (there is no limitation in the use of the game value information) which can be converted into cash by a cashier. The second storage area AR2 can write a game value corresponding to a dividend obtained by playing the game in the slot machine 1010. Information representing the type of the game value stored in the second storage area AR2 and the amount thereof is referred to as second game value information.

Both the first game value information and the second game value information are, in principle, treated as a cash equivalent.

A third area cannot be deposited by a player, and is the third storage area AR3 capable of storing a game value (point) given by promotion by a game facility such as a casino, use of a facility, game play, and the like. The game value stored in the third storage area AR3 cannot be, in principle, converted into cash by the cashier 202, and is only permitted to be used in the game by the slot machine 1010 (so-called free play). Information representing the type of the game value stored in the third storage area AR3 and the amount thereof is referred to as third game value information.

A fourth area cannot be deposited by a player, and is the fourth storage area AR4 capable of storing a game value (point) given by promotion by a game facility such as a casino, use of a facility, game play, and the like. The game value stored in the fourth storage area AR4 cannot be, in principle, converted into cash by the cashier 202 and is even permitted to be used for various services in the facility in addition to the use in the game (so-called bonus credit). Information representing the amount of game value stored in the fourth storage area AR4 is referred to as fourth game value information.

In principle, both the third game value information and the fourth game value information are not, in principle, treated as a cash equivalent.

[Content of Program Executed in Slot Machine]

Figure 7:
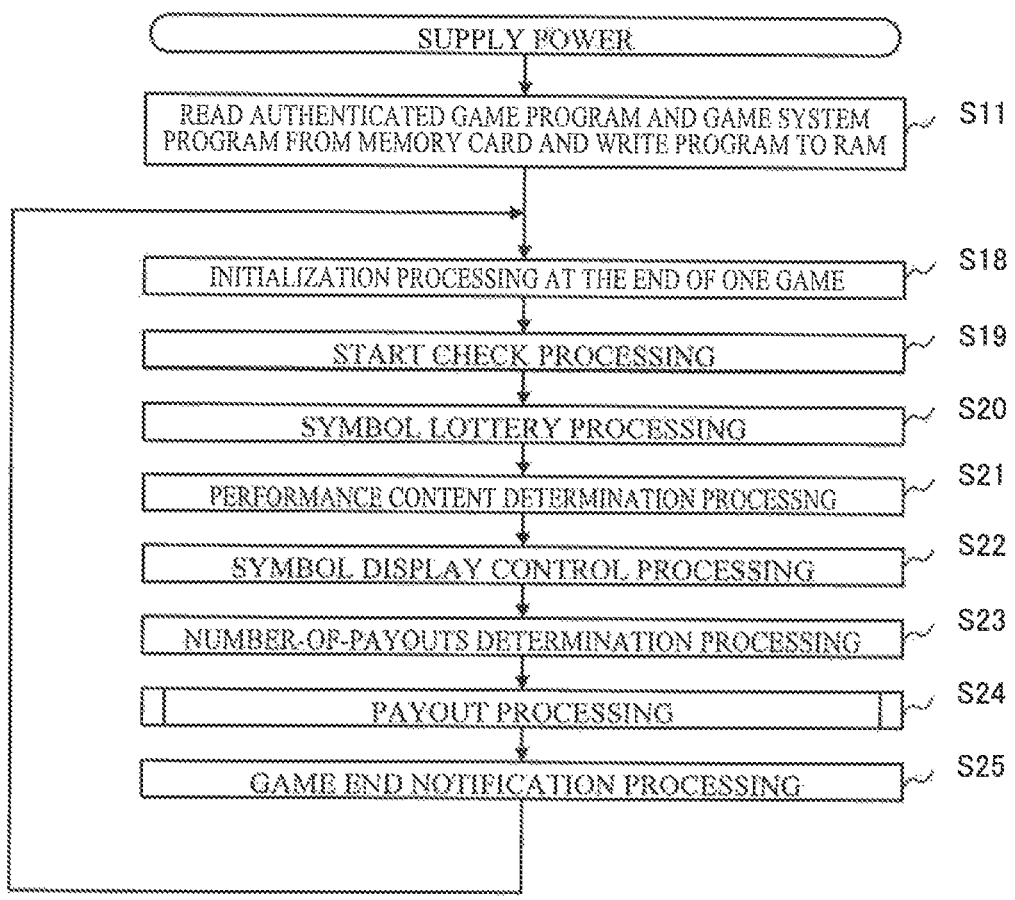
FIG. 7 is a flowchart illustrating a procedure of main control processing of the slot machine according to the embodiment of the present invention.

Next, a program to be executed by the slot machine 1010 will be described with reference to FIG. 7. The slot machine 1010 transmits various kinds of game information to the hall management server (not illustrated) at an appropriate timing.

[Main Control Processing]

First, main control processing will be described with reference to FIG. 7. First, when power is supplied to the slot machine 1010, the main CPU 1071 reads the game program and game system program authenticated from the memory card 1054 via the gaming board 1050, and writes the read game program and game system program to the RAM 1073 (step (hereinafter abbreviated as S) 11).

Next, the main CPU 1071 performs initialization processing at the end of one game (S18). For example, data that become unnecessary for each game in the work area of the RAM 1073 such as the number of BETs and symbols determined by lottery are cleared.

Next, the main CPU 1071 performs start check processing which will be described later (S19). In S19, the input check of a BET switch and a spin switch is performed. In the embodiment, when the IC card 1500 (member information card or non-member information card) is inserted into the card insertion slot 1730, the game value is read from the inserted IC card 1500 and is set to a number-of-credits counter, whereby it is possible to play the game within a range of the set number of credits. When the IC card 1500 is not inserted thereinto, the number-of-credits counter is set in accordance with an amount of a currency inserted into the bill validator 1022, whereby the game can be played.

Next, the main CPU 1071 performs symbol lottery processing which will be described later (S20). In S20, a stop-scheduled symbol is determined based upon a random numerical value for symbol determination.

Next, the main CPU 1071 performs performance content determination processing (S21). The main CPU 1071 extracts a random numerical value for the performance, and determines one of a plurality of predetermined performance contents by lottery. The contents of the performance can be determined according to a winning combination and a situation of the game in the slot machine 1010. For example, it can be configured to vary the lottery probability with respect to each performance according to the winning combination and the situation of the game in and the slot machine 1010.

Next, the main CPU 1071 performs symbol display control processing which will be described later (S22). In S22, scrolling of the five columns of pseudo reels 1151 to 1155 (first to fifth video reels) is started, and then the stop-scheduled symbol determined in the symbol lottery processing of S20 is stopped at a predetermined position (for example, the display window 1150 of the lower image display panel 1141). That is, for each reel, four symbols including the stop-scheduled symbol are displayed in the display window 1150. For example, when the stop-scheduled symbol is a symbol of a code number "10" and the symbol of code number "10" is displayed in the upper stage area, the respective symbols of code numbers "11", "12" and "13" are respectively displayed in the upper middle stage, lower middle stage, and lower stage in the display window 1150.

Next, the main CPU 1071 performs number-of-payouts determination processing which will be described later (S23). In S23, the number of payouts is determined based upon the combination of symbols displayed on a pay line, and is stored in a number-of-payouts counter provided in the RAM 1073.

Next, the main CPU 1071 performs payout processing (S24). The main CPU 1071 adds a value stored in the number-of-payouts counter to the number-of-credits counter provided in the RAM 1073. Here, for example, when a player presses a CASHOUT button, the CASHOUT switch 1033S which detects a fact that the CASHOUT button is pressed outputs a signal to the main CPU 1071, and the number of credits stored in the IC card 1500 held in the card unit 1741 is updated to the value of the number-of-credits counter. That is, when the IC card 1500 (member information card or non-member information card) is inserted into the card unit 1741, the number of credits (game value) read from the inserted IC card 1500 is written to the number-of-credits counter; the game (BET) is played according to the written number of credits; and a result in which the dividend is added according to the result of the game and a value of the number-of-credits counter which includes the number-of-credits of a result in which the number of credits for the number of BETs is subtracted are written as the balance information of the game value to the IC card 1500 to be finally paid out, whereby the balance information of the IC card 1500 is updated and the IC card 1500 is discharged from the card insertion slot 1730. When the game is played by a currency inserted into the bill validator 1022 in a state where the IC card 1500 is not inserted into the card unit 1741, a dividend given to the player as a result of the game and a balance of the inserted currency are stored in the number-of-credits counter, after which the dividend and the balance are written as the balance information to the unused IC card 1500 prepared in the card stacker 1742 according to the operation of the CASHOUT button. Next, the IC card 1500 is discharged from the card insertion slot 1730 as the non-member information card.

Next, the main CPU 1071 performs game end notification processing (S25). In S25, the main CPU 1071 transmits data indicating that one game ends (data including game end date data capable of specifying the game end date and time) to the PTS terminal 1700 (together with the identification code, and the like of the IC card 1500 when the IC card 1500 and the like are inserted thereinto and thus the player can be identified). The PTS terminal 1700 transmits the aforementioned data to the hall management server, and the hall management server (not illustrated) stores the data. In response thereto, the bonus server (not illustrated) performs the lottery of the bonus game. When the processing of S25 is completed, the processing is returned to the processing of S18 and the unit game is repeated.

[Payout Processing]

Figure 8:
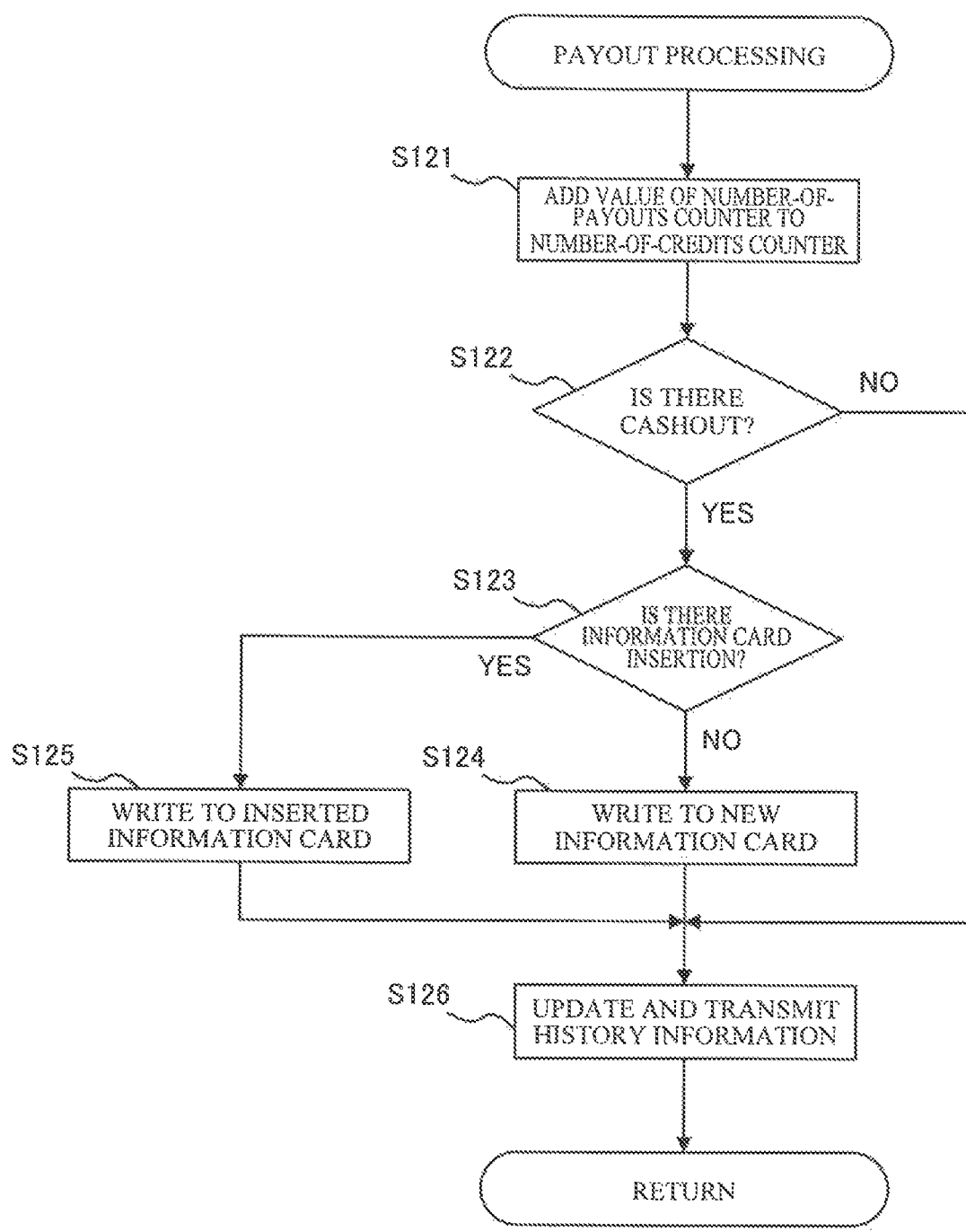
FIG. 8 is a flowchart illustrating a procedure of payout processing of the slot machine according to the embodiment of the present invention.

Next, the payout processing will be described with reference to FIG. 8. First, when entering the payout processing, the main CPU 1071 adds the value of the number-of-payouts counter to the number-of-credits counter (S121), and then determines whether the CASHOUT button is operated (S122).

When the player operates the CASHOUT button, the main CPU 1071 obtains a positive result in S122, thereby shifting the processing from S122 to S123, then the main CPU 1071 determines whether the IC card 1500 (member information card or non-member information card) was inserted into the card unit 1741 from the card insertion slot 1730 to play the game.

When the positive result is obtained in S123, the result indicates that the IC card 1500 (member information card or non-member information card) owned by the player is being inserted into the card unit 1741, and the main CPU 1071 shifts the processing from S123 to S125, after which the main CPU 1071 writes the value of the number-of-credits counter to the IC card 1500 (member information card or non-member information card) inserted into the card unit 1741 here.

On the other hand, when a negative result is obtained in S123, the result indicates that the game is played in a state where the IC card 1500 (member information card or non-member information card) is not inserted into the card unit 1741, and the main CPU 1071 shifts the processing from S123 to S124, after which the main CPU 1071 writes the value of the number-of-credits counter here (that is, the balance of the number of credits which is a result of the game) as the balance information to the unused IC card 1500 prepared in advance in the card stacker 1742.

After completing the processing in S124 or when the negative result is obtained in S122 described above (that is, when the CASHOUT button is not operated), the main CPU 1071 shifts the processing to S126, updates history information on the game stored as one game is executed, and transmits the updated history information to the information processing device 500. Then, the processing is returned to the main control processing illustrated in FIG. 7.

Thus, the payout processing is executed by the main CPU 1071, whereby the IC card 1500 (member information card or non-member information card) in which the balance information is written is paid out from the card insertion slot 1730. The player can convert the paid-out IC card 1500 into a currency based upon the balance information written to the IC card 1500 by bringing the paid-out IC card 1500 to a predetermined cashier. When the player continues to play the game, the IC card 1500 is inserted into the card insertion slot 1730 of the other slot machine such that the game in the other slot machine can be played by using the balance information written to the IC card 1500.

As a result, the balance information written to the IC card 1500 may be information briefly representing the game value such as the currency converted from the number of credits remaining as a result of the game in the slot machines 1010A, 1010B, and the like, or the number of credits itself, and the like. The information is read by the reader of the cashier 202 (FIG. 1A) and refunded to the player as the currency of a corresponding amount.

In S126, as illustrated in FIG. 9A, the history information transmitted to the information processing device 500 includes: slot machine identification information for identifying the slot machine which is a generation source of the history information; a date and time of each game; an inserted amount when the currency is inserted at the start of the game; a game result (type of winning, and the like); an inserted amount (when the IC card 1500 is inserted, the inserted amount is an amount read from the IC card 1500; when cash is inserted, the inserted amount is an amount identified by the bill validator 1022 (FIG. 4)); and when both the IC card 1500 and the cash are inserted, the total of both of them is represented as the inserted amount); a balance (including both the balance of the number-of-payouts counter which is a result of the game and the balance of the number-of-credits counter); the number of payouts (an amount paid out by performing writing from the number-of-credits counter to the IC card 1500 (member information card or non-member information card); and information card identification information (for example, information unique to each card such as a number such as "001") for specifying the IC card 1500 (member information card or non-member information card) to which the pieces of history information are written. When the associated IC card 1500 is inserted into the slot machines 1010A, 1010B, and the like before the game is played, since the IC card 1500 is the member card or the non-member card owned by the player in advance, "continuous use 1" is assigned in association with the information card identification information among the history information (for example, FIG. 9B), and then is transmitted. On the other hand, when the IC card 1500 is not inserted thereinto before the game is played, the information of "continuous use 0" indicating the history information which is associated with the non-member information card newly paid out from the card stacker 1742 is assigned to the information card identification information among the history information, and then is transmitted.

Thus, when the information processing device 500 receives the history information from the slot machines 1010A, 1010B, and the like and when the information with respect to the "continuous use" associated with the information card identification information among the received history information is the "continuous use 0", the information indicates the history information associated with the non-member information card to be newly paid out, that is, indicates that the IC card 1500 is started to be used by a new player (usually a non-member), and starting from the history information, every time the history information imparted with the same information card identification information together with the information of the "continuous use 1" is received thereafter, the pieces of history information are associated with each other as a series of time-series history information (FIG. 10). Accordingly, the non-member information card is newly paid out from the slot machines 1010A, 1010B, and the like where the non-member player plays the game first, after which every time the IC card thereof is inserted into the next slot machines 1010A, 1010B, and the like, and the balance of the non-member information card is used for the next game play, these game actions are stored in the database of the information processing device 500 in time series as a series of history information. In FIG. 9A, when a player inserts cash and plays a game in the slot machine (for example, the slot machine 1010A) whose slot machine identification information is "0010", and then the CASHOUT button is operated by the player and the IC card 1500 whose information card identification information "0001" is issued as the non-member information card from the card stacker 1742, the history information transmitted from the slot machine 1010A to the information processing device 500 is represented in response thereto. In FIG. 9B, when the non-member information card (IC card 1500) whose information card identification information is "0001" is inserted from the card insertion slot 1730, the balance thereof is read from IC card 1500 and a game is played in the slot machine (for example, the slot machine 1010B) whose slot machine identification information is "0011", and then the CASHOUT button is operated by the player and the non-member information card (IC card 1500) whose balance information is updated is paid out from the card insertion slot 1730, the history information transmitted from the slot machine 1010B (PTS terminal 1700) to the information processing device 500 is represented in response thereto. When one such non-member information card is sequentially inserted into the slot machines 1010A, 1010B, and the like, and is continuously used, the pieces of history information transmitted from the respective slot machines 1010A, 1010B, and the like to the information processing device 500 are stored and managed in a storage part such as the database 560, the RAM 553, and the like of the information processing device 500 as a series of history information associated with the information card identification information as illustrated in FIG. 10.

In other words, even against a player who is a non-member, the player can continue to use one non-member information card at a casino, such that it becomes possible for the information processing device 500 to grasp game behavior of the player (in which slot machine, how to insert the money and play the game, and information on the game result thereafter and the amount paid out) as if the player were a member.

The main CPU 1071 transmits the pieces of history information to the information processing device 500 in association with the information specifying the slot machine 1010 (for example, the information unique to each slot machine such as a number such as "0010").

Accordingly, in the information processing device 500, it is possible to store the history of games in the respective slot machines 1010A, 1010B, and the like for each IC card 1500 (member information card or non-member information card). When the IC card 1500 is continuously used in a plurality of slot machines 1010, the identification information of the slot machine 1010 and the history information associated with the identification information are stored for each IC card 1500 (FIG. 10), whereby it is possible to grasp the game behavior (information on how many times the game is played in which slot machine 1010 and how much money is inserted thereinto in the game hall) of the player owning the IC card 1500.

In the history information illustrated in FIG. 9A, it is described that 50 dollars in cash is inserted at 10:00 on Aug. 1, 2018; the balance of the slot machine 1010A specified by the slot machine identification information "0010" becomes 50 dollars which is the inserted amount; thereafter, a game is played at 10:05 and a prize is awarded such that the balance increased to 80 dollars; as a result of playing the game at 10:10, the balance decreased to 20 dollars; and an additional 30 dollars in cash is added at 10:15 such that the additionally inserted amount is added to the previous balance in the slot machine 1010A and thus the balance thereof becomes 50 dollars. Next, according to the result of the game played at 11:00, the balance becomes 60 dollars and then the CASHOUT button is operated at 11:05, whereby the total amount of the balance is written to the IC card 1500 and is paid out.

The history information illustrated in FIG. 9A is the information indicating that the history until the new IC card 1500 prepared in advance from the card stacker 1742 is paid out as the non-member information card after the IC card 1500 is paid out in the slot machine 1010A is transmitted from the slot machine 1010 (PTS terminal 1700) to the information processing device 500 as the history information associated with the new non-member information card (information card identification information).

In the history information illustrated in FIG. 9B, it is described that the IC card 1500 (information card identification information "0001") is inserted into another slot machine 1010B (PTS terminal 1700) whose slot machine identification information is "0011" at 11:30 on Aug. 1, 2018; the balance (60 dollars) is read from the IC card 1500 to the slot machine 1010B; thereafter, a game is executed; and the CASHOUT button is operated such that the balance (10 dollars) in the slot machine 1010B is written to the IC card 1500 and paid out at 12:00. The history information illustrated in FIG. 9B is transmitted from the slot machine 1010B to the information processing device 500 by the operation of the CASHOUT button.

When the IC card 1500 is inserted into the slot machine 1010B, the slot machine 1010B (PTS terminal 1700) transmits information card identification information read from the inserted IC card 1500 to the information processing device 500. The information processing device 500 determines whether the information card identification information coincides with the identification information of the member information card which is registered as a member and is registered in the database 560, and when the information card identification information does not coincide with the identification information thereof, the information processing device 500 returns a fact that the inserted IC card 1500 is the non-member information card to the slot machine 1010B. When the inserted IC card 1500 is the member information card, the information processing device 500 returns a fact that the inserted IC card 1500 is the member information card to the slot machine 1010B. In the slot machine 1010B, when the inserted IC card 1500 is the non-member information card based upon the return information, the information representing the continuous use "1" illustrated in FIG. 9B is associated with the information card identification information and the history information is stored, thereby performing the processing in response to the fact that the inserted IC card 1500 is the non-member information card.

[Information Management Processing of Information Management Systems]

Figure 11:
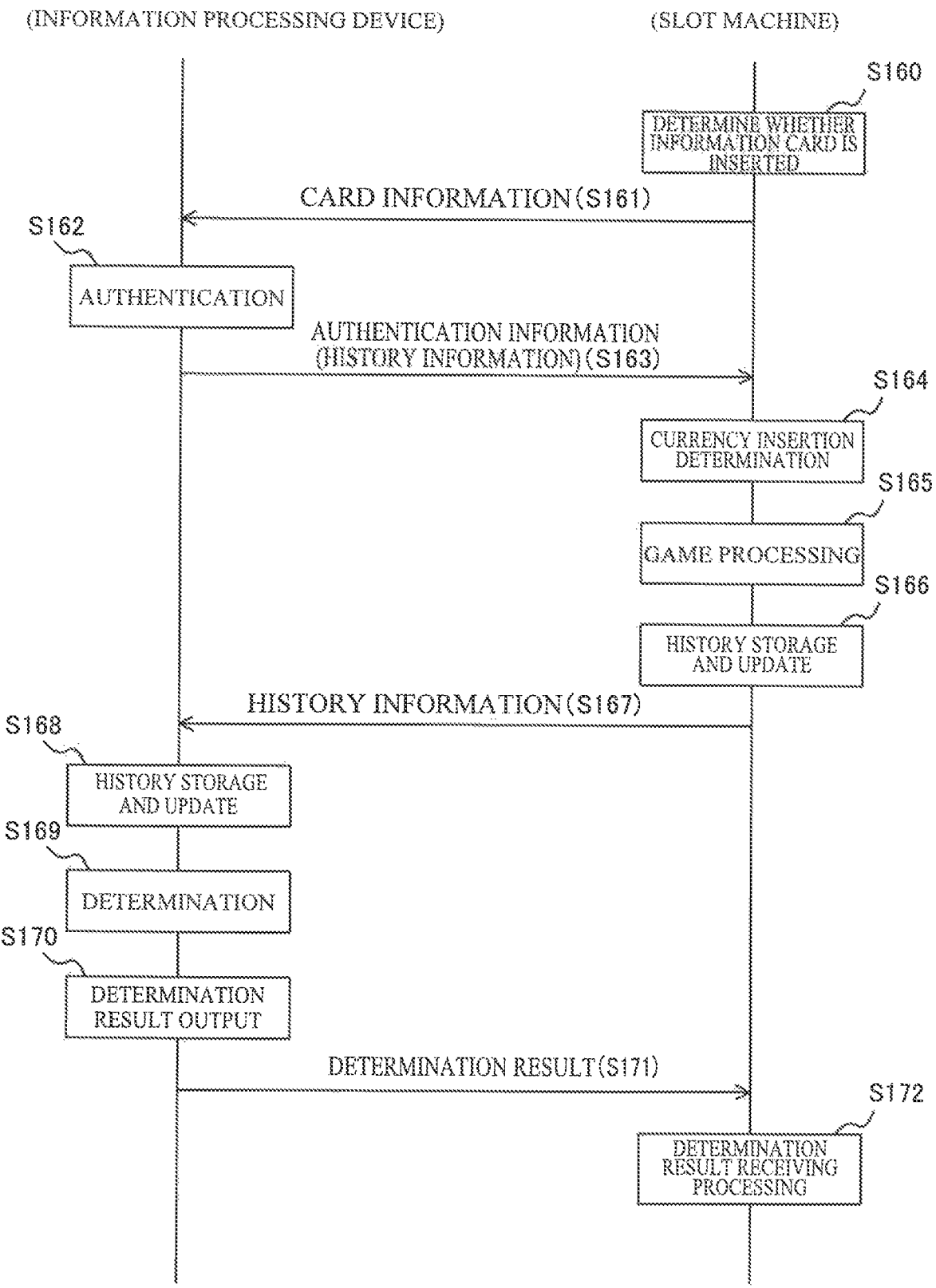
FIG. 11 is a flowchart illustrating a procedure of transmitting and receiving information between the slot machine and the information processing device according to the embodiment of the present invention.

FIG. 11 is a flowchart illustrating a procedure of transmitting and receiving history information between the information processing device 500 and the respective slot machines 1010A, 1010B, and the like in the information management system 100, and a procedure of determination processing based upon the history information.

First, when it is determined that the IC card 1500 (member information card or non-member information card) is inserted into the slot machines 1010A, 1010B, and the like (S160), the slot machines 1010A, 1010B, and the like read card information (information card identification information (card number), and the like) from the inserted IC card 1500, and then transmit the card information to the information processing device 500 (S161). Here, when the slot machines 1010A, 1010B, and the like capture a face image of a player by the human body detection camera 1713 (FIG. 5), the image data are transmitted to the information processing device 500 together with the card information. Without being limited to the face image, various kinds of human body information can be used as long as the image data are the human body information such as fingerprint information, and the like.

The information processing device 500 performs authentication processing based upon the card information and the image data transmitted from the slot machines 1010A, 1010B, and the like (S162). Specifically, it is determined whether the card is a member-registered card (member information card) or the non-member information card which is not registered as a member, based upon the information card identification information (information card number), and based upon the image data, authentication based upon the registration information of the member information card is completed, that is, when the face image is already registered, image authentication is performed to determine whether a player is a regular registered member.

When it is determined that the player is the regular registered member by the above-described authentication processing, or when the player is not the registered member but the information card number coincides with the card number of the card which is legitimately prepared (IC card 1500 prepared in the card stacker 1742 of the respective slot machines 1010A, 1010B, and the like), it can be determined that the card is a regular non-member information card.

When the above-described authentication processing is completed, an authentication result is returned to the slot machine (either one of the slot machines 1010A, 1010B, and the like) which is a transmission source from which the card information is transmitted here as authentication information (S163).

The slot machines 1010A, 1010B, and the like receiving the authentication information allow the player to play the game based upon the fact that the inserted IC card 1500 is a regular card.

When the game value (currency, and the like) is inserted (S164), the authenticity determination of the inserted currency and the amount thereof are read and stored in the RAM 1073 (FIG. 5) of the slot machines 1010A, 1010B, and the like. When the IC card 1500 (member information card or non-member information card) is inserted and the currency is inserted, the number of credits by the inserted currency is added to the number of credits read from the IC card 1500 for the game play. When the IC card 1500 is not inserted, the number of credits by the inserted currency is used for the game play. When the IC card 1500 is inserted, a part of the number of credits stored in the IC card 1500 can be also used for the game. The number of used credits can be arbitrarily designated by a player by operating the touch panel of the LCD 1719 of the PTS terminal 1700.

Accordingly, the game processing is executed by the number of credits based upon the inserted IC card 1500 or the inserted currency (S165). The result of the game processing (type of winning, dividend, and the like.) is sequentially stored in the RAM 1073 of the slot machine (either one of the slot machines 1010A, 1010B, and the like) as the history information in association with the information card identification information (information card number).

When the game is finished and, for example, the player operates the CASHOUT button, the history information stored in the slot machine is transmitted to the information processing device 500 (S167). S167 is performed by the processing of S126 of the payout processing illustrated in FIG. 8. When the game is started in a state where the IC card 1500 (member information card or non-member information card) is not inserted into each of the slot machines 1010A, 1010B, and the like, a history from the game until, thereafter, the CASHOUT button is operated and the new IC card 1500 is paid out is transmitted as a series of history information to the information processing device 500. Since the series of history information is the history of the game performed in a state where the IC card 1500 is not inserted, the series of history information is associated with the information card identification information (information card number) of the IC card 1500 to be newly issued here as the non-member information card. On the other hand, when the IC card 1500 (member information card or non-member information card) is inserted and the game is started, after the IC card 1500 is inserted, the history information until the IC card 1500 is paid out is associated with the information card identification information of the IC card 1500 as a series of history information and then the history information associated therewith is transmitted from the slot machines 1010A, 1010B, and the like to the information processing device 500.

As described above, in a case where the information processing device 500 receives the history information transmitted from the slot machines 1010A, 1010B, and the like in association with the IC card 1500, when history information corresponding to the information card identification information (information card number) associated with the history information is already stored in the database, the information processing device 500 causes the pieces of history information to be associated with each other, and then the associated history information is stored in the database (S168). Since the association of the history information is the association in which the IC card 500 is used by the same player, the history information in which the information representing the "continuous use" associated with the information card identification information (information card number) of the non-member information card is "0" is first stored in the database, after which the history information in which the information representing the "continuous use" is "1" is stored in the database in time series as a series of history information (refer to FIG. 10). That is, as long as the IC card 1500 is continuously used by the same player, even when the player plays the game while moving to the respective slot machines 1010A, 1010B, and the like, the pieces of history information of the games are associated with each other as a series of history information corresponding to the information card identification information (information card number) of the IC card 1500 in the database of the information processing device 500. In a case where the image data of face images are associated with each other, only when the same person is identified by the authentication of the face image by the image data, the pieces of history information of the games are associated with each other as a series of history information.

Regardless of the information representing the "continuous use" (whether the continuous use is "0" or "1"), the pieces of history information associated with the member information card are associated with each other as a series of history information corresponding to the same information card identification information (information card identification information which is registered corresponding to a player registered as a member). In the case of history information of the member, when the face image is registered as member information and when the image data of the face image are transmitted corresponding to the history information from the slot machines 1010A, 1010B, and the like, it is also possible to perform the authentication of whether a player is a member by using the face image.

As described above, when the history information associated with the IC card 1500 (member information card or non-member information card) is stored in the information processing device 500, the information processing device 500 performs determination based upon, for example, game behavior such as game dependency of a player based upon the history information (S169). The determination processing will be described later.

As a result of the determination, for example, when the game dependency is detected, in the information processing device 500, a warning is displayed (S170), and the determination result is transmitted from the information processing device 500 to the slot machines 1010A, 1010B, and the like into which the IC card 1500 related to the warning is inserted here (S171). Thus, by performing a predetermined warning display in the information processing device 500, a person in charge of management of the game hall can take a countermeasure against the warning. For example, some kinds of advice can be given to the player who is detected as the person having the game dependency. The slot machines 1010A, 1010B, and the like which receive the warning information can directly transmit the warning by issuing the warning in the slot machines 1010A, 1010B, and the like, and by presenting the display directly to the corresponding player.

[Determination Processing]

Figure 12:
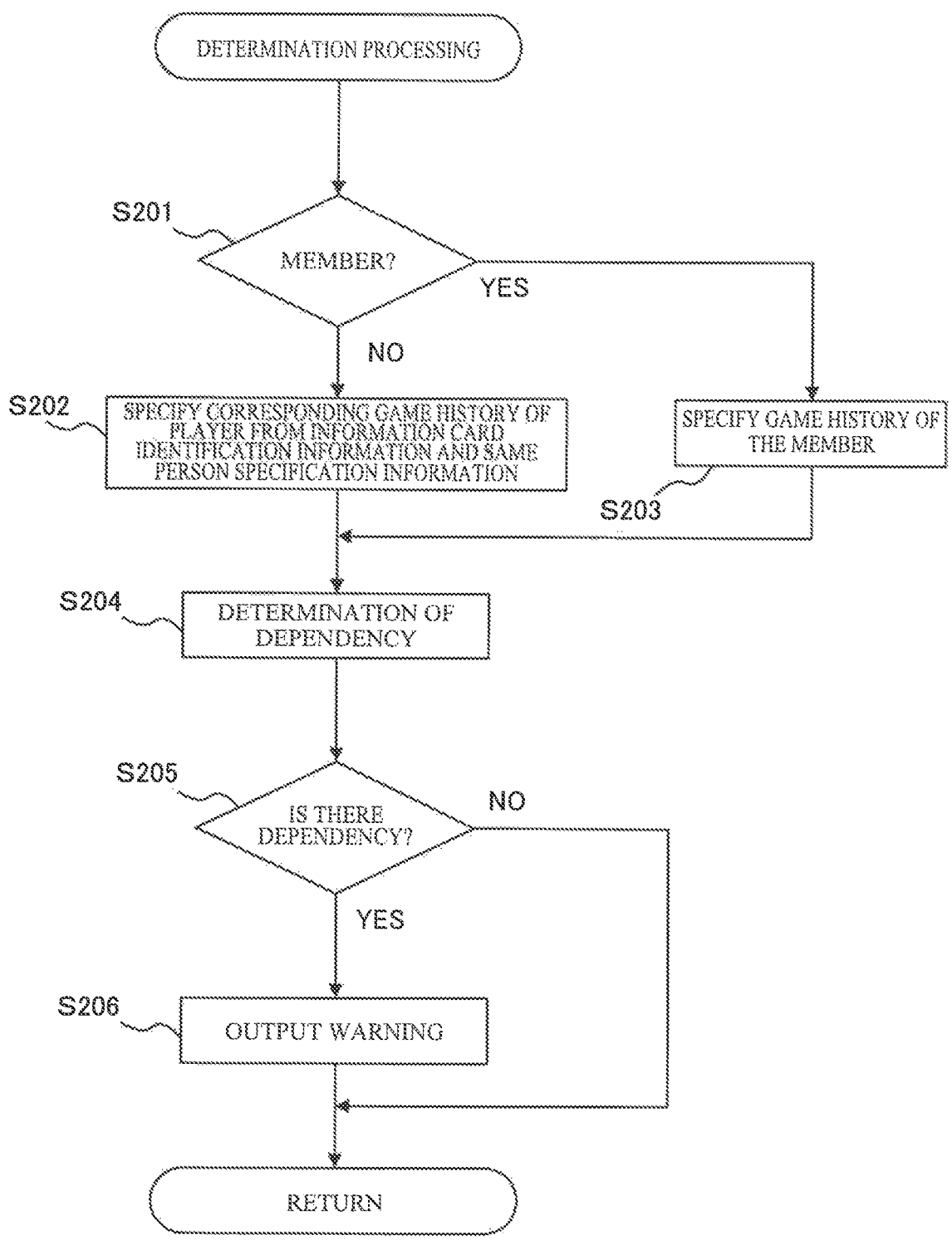
FIG. 12 is a flowchart illustrating a procedure of determination processing in the information processing device according to the embodiment of the present invention.

FIG. 12 is a flowchart illustrating a detailed processing procedure of the determination processing (processing of S169 in FIG. 11) in the information processing device 500. In the information processing device 500, the determination processing is executed every time the history information is received from the slot machines 1010A, 1010B, and the like, and the received history information is stored in the database. However, the timing to be executed is not limited thereto, and may be executed at any timing.

When entering the determination processing, the CPU 551 (FIG. 1B) of the information processing device 500 determines whether a determination target is a member (S201). Specifically, among the series of associated history information stored in the database 560, it is determined whether history information which becomes the determination target is the history information of a member according to whether the history information which becomes the determination target is the information card identification information (information card number) associated with the personal information of a player registered as a member.

When the history information which becomes the determination target is not the member information, the CPU 551 obtains a negative result in S201, shifts the processing from S201 to S202, specifies the corresponding history information on the database from the information card identification information and the same person specification information (for example, image data of a face image), and determines the game dependency based upon the specified history information (S204).

On the other hand, when the determination target is a member, the CPU 551 obtains a positive result in S201, shifts the processing from S201 to S203, and specifies history information which is the game history of the member from the database 560. Specifically, the history information is specified from the information card identification information (information card number) which is registered as a member.

In 204, the CPU 551 determines the game dependency from the history information. Here, for example, when there are a plurality of times of game value insertions (a plurality of times of credit purchases) in one visit; when there is a tendency that the total amount of inserted money increases when a player visits to a game facility with a plurality of times of visits to the game facility; when there is a tendency that even though a player wins a game big once, the player continues playing the game until the player finally loses the game (until all of the inserted money is used) in one visit; or in a case where an insertion limit amount is set in advance, when the game value is inserted beyond the insertion limit amount, it is determined that there is the dependency on the game.

After such determination is performed, when determining that there is the dependency, the CPU 551 obtains a positive result in S205, shifts the processing from S205 to S206, and outputs predetermined warning information. Specifically, predetermined warning display (visible display, audible display, and the like.) is performed in the information processing device 500, and warning information is transmitted to the slot machine (either one of the slot machines 1010A, 1010B, and the like) into which the IC card 1500 to be determined here is inserted, after which the determination processing is terminated. In the slot machine (either one of slot machines 1010A, 1010B, and the like) receiving the warning information, the predetermined warning display is directly performed to the player.

On the other hand, when a negative result is obtained in S205, the result indicates that it is determined that there is no dependency, and the CPU 551 terminates the determination processing.

[Use of IC Card in a Plurality of Slot Machines]

Figure 13A:
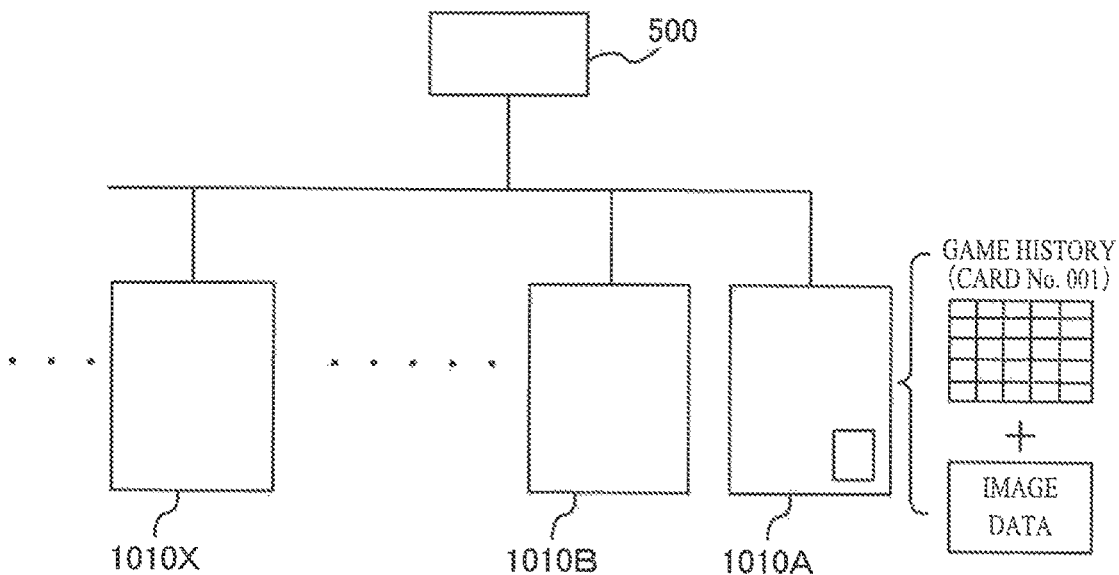
FIGS. 13A and 13B are schematic diagrams illustrating an operation of the information management system according to the embodiment of the present invention.
Figure 13B:
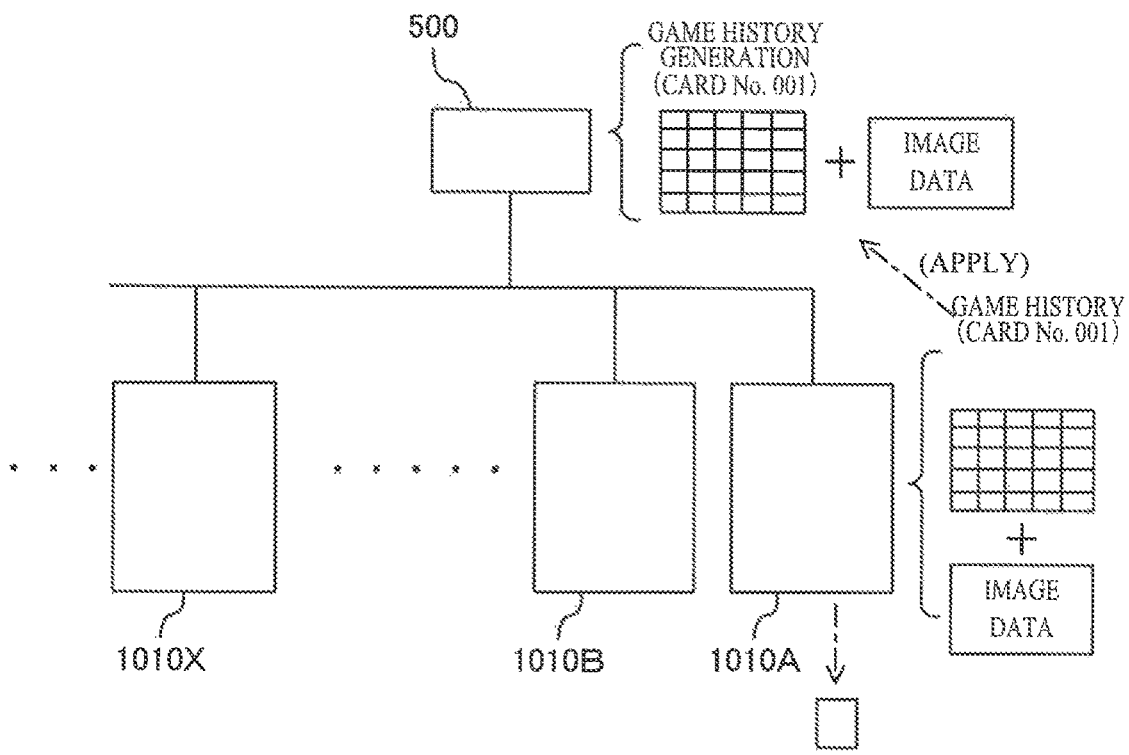

In the above-described configuration, as illustrated in FIG. 13A, for example, when a player who is not registered as a member inserts a currency into the slot machine 1010A and starts a game, the slot machine 1010A stores a history of the game (inserted amount, game result, credit balance, and the like) as a game history (history information). Then, when the player operates the CASHOUT button, a face image is captured and stored as image data in association with the game history (history information) stored here; as illustrated in FIG. 13B, the number of credits remaining in the number-of-credits counter is written as balance information to the unused IC card 1500 prepared in the card stacker 1742; and the IC card 1500 is paid out as the non-member information card from the card insertion slot 1730. The game history (history information) corresponding to the balance information written to the IC card 1500 and the image data of the face image are associated with the information card identification information (information card number) of the IC card 1500, transmitted to the information processing device 500, and stored in the database 560 of the information processing device 500.

Figure 14A:
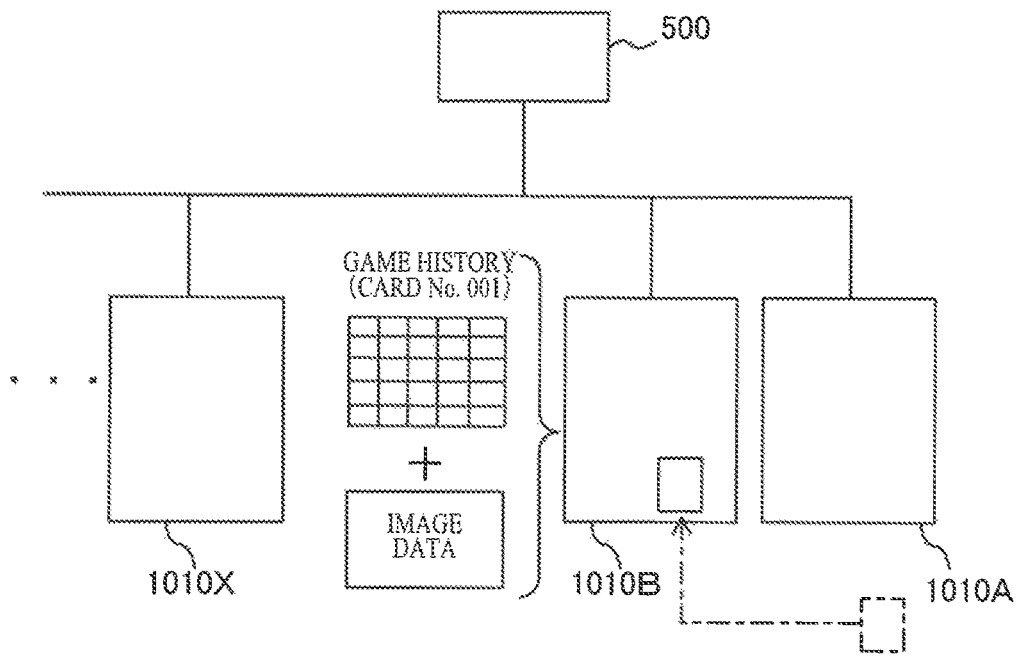
FIGS. 14A and 14B are schematic diagrams illustrating the operation of the information management system according to the embodiment of the present invention.
Figure 14B:
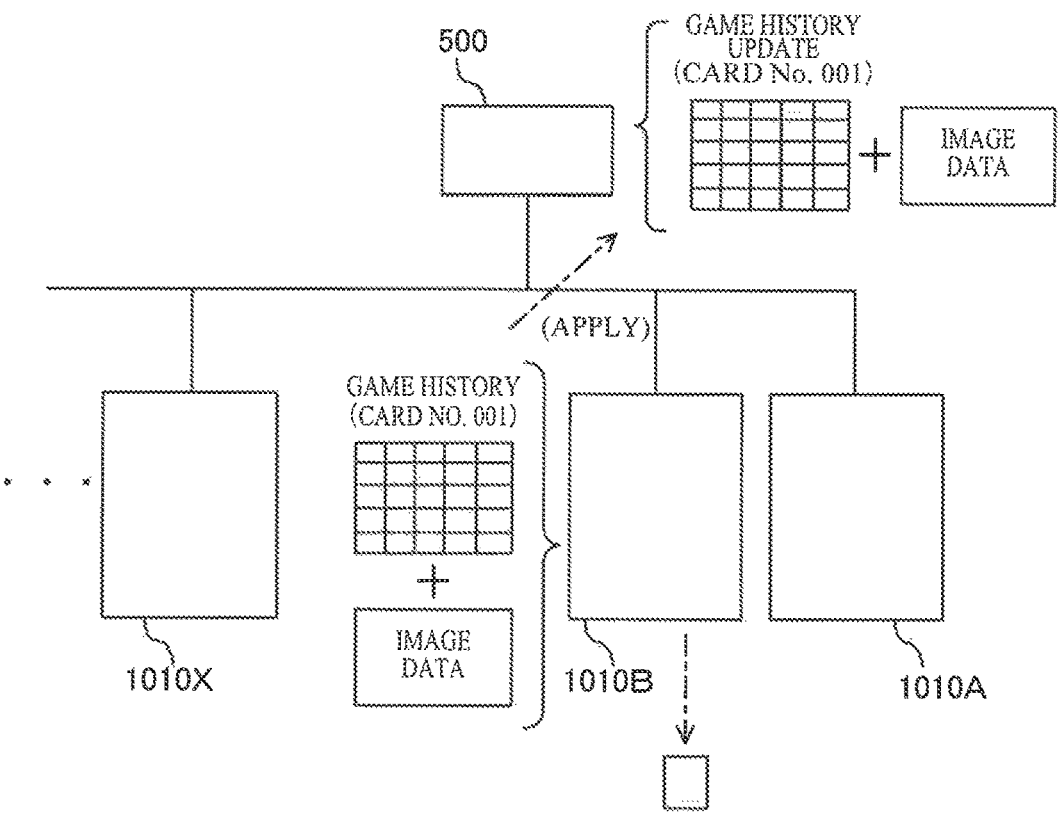

The player owning the IC card 1500 paid out from the slot machine 1010A continuously inserts the IC card 1500 into another slot machine 1010B as illustrated in FIG. 14A, and when the game is started in the slot machine 1010B, the game history is stored in association with the information card identification information (information card number) of the IC card 1500 inserted here according to the progress of the game in the slot machine 1010B. Next, when the player finishes the game and operates the CASHOUT button, the face image of the player is captured, and the face image thereof is stored as the image data in association with the information card identification information (information card number) of the IC card 1500 being inserted thereinto here. Next, the balance information remaining in the number-of-credits counter is written to the IC card 1500 being inserted thereinto, thereby updating the balance information.

The game history (history information) corresponding to the updated balance information is transmitted from the slot machine 1010B to the information processing device 500, and is stored as the history information associated with the information card identification information in the data base 560.

As described above, with respect to the non-member information card for which the IC card 1500 is issued, the game histories thereof are sequentially stored in the database for the plurality of slot machines 1010A, 1010B, and the like, thereby making it possible to grasp the game behavior of the same player even for the non-member based upon the history information thereof, whereby, for example, it is possible not only to determine the game dependency, but also to take a countermeasure such as outputting a warning, and the like.

[Use of Non-Member Information Card]

Figure 15:
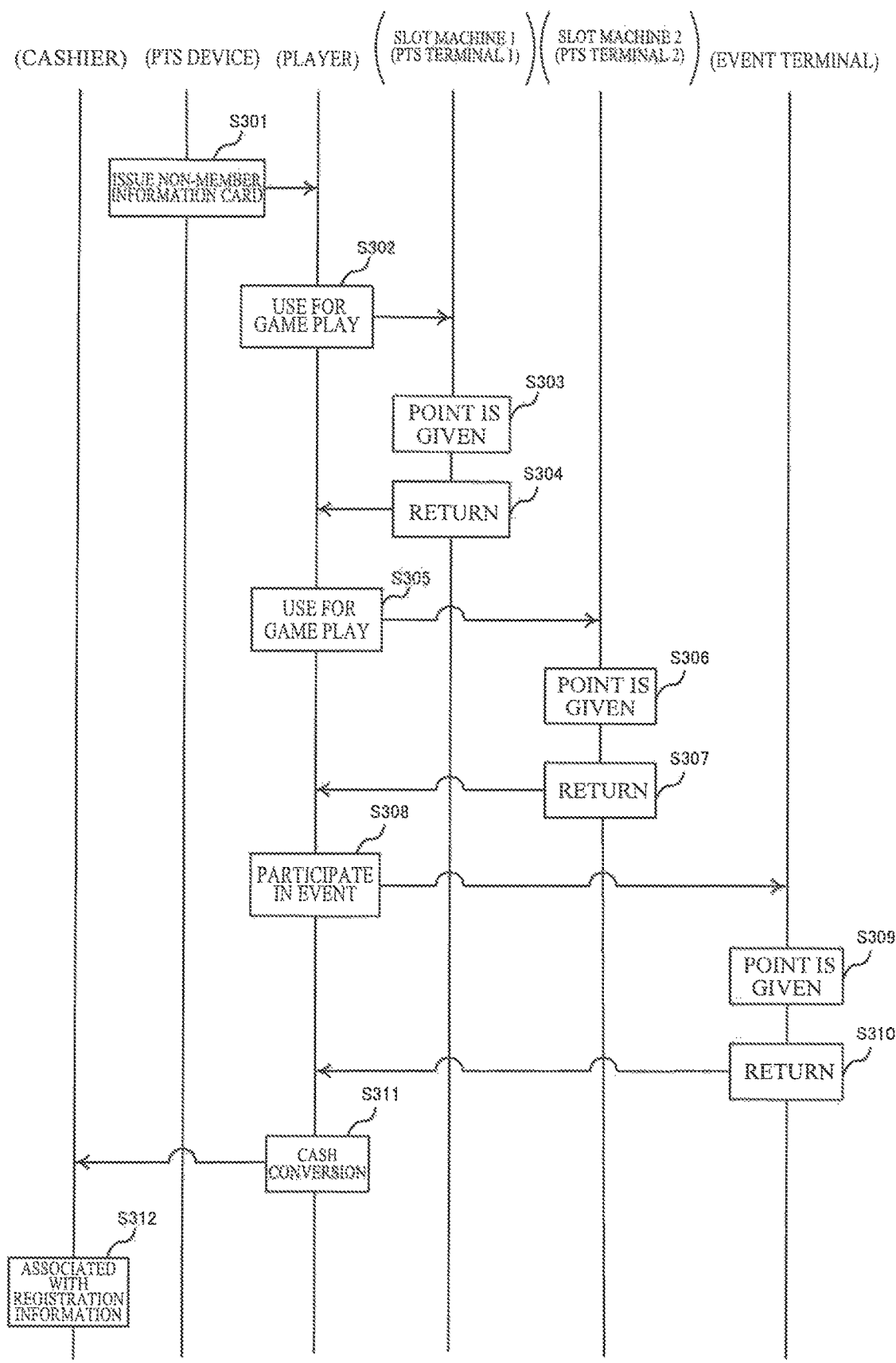
FIG. 15 is a schematic diagram illustrating the operation of the information management system according to the embodiment of the present invention.

FIG. 15 is a flowchart illustrating a use mode of the non-member information card (IC card 1500) in the information management system 100. FIG. 15 can be used not only in the non-member information card but also in the member information card in the same use mode.

First, in either one of the slot machines 1010, a player who is a non-member (or a player who plays a game without disclosing his or her registration information even though the player is registered as a member) plays a game in the slot machine 1010 by inserting cash into the bill validator 1022 (FIG. 4); a dividend given as a result of playing the game is written to the IC card 1500 (non-member information card) of the card stacker 1742 which is newly issued; and then the newly issued IC card 1500 is discharged to the player (S301). Here, a point given in the game play (for example, a point given every time 5 dollars is used) is written to the IC card 1500 in addition to the dividend by the game play. Credit information by the dividend given as a result of playing the game and information on the given point (point balance) are respectively classified and stored in different storage areas of the IC card 1500.

For example, the player receiving the IC card 1500 of the non-member inserts the IC card 1500 into the PTS terminal 1700 of another slot machine 1010 (slot machine 1), and then plays a game (S302). Here, the credit information and the point information usable for the game play are read out from the inserted IC card 1500 and inserted into the game play. Here, the credit information by the dividend and the point balance which are classified and stored in the IC card 1500 are displayed on the LCD 1719 (FIG. 3) of the PTS terminal 1700, and the player can selectively designate one or both thereof and insert the selectively designated one into the game play.

When the game play is finished in the slot machine 1010 (slot machine 1), the storage information of the IC card 1500 being inserted into the PTS terminal 1700 here is updated with the credit information by the dividend and the information of the newly given point (S303) by an end operation of the player, after which the updated IC card 1500 is discharged from the PTS terminal 1700. That is, the IC card 1500 is returned to the player (S304).

The player receiving the return of the IC card 1500 of the non-member further inserts the IC card 1500 into the PTS terminal 1700 of another slot machine 1010 (slot machine 2), and then plays a game (S305). Here, the credit information and the point information usable for the game play are read out from the inserted IC card 1500 and inserted into the game play. Here, the credit information by the dividend and the point balance which are classified and stored in the IC card 1500 are displayed on the LCD 1719 (FIG. 3) of the PTS terminal 1700, and the player can selectively designate one or both thereof and insert the selectively designated one into the game play.

When the game play is finished in the slot machine 1010 (slot machine 2), the storage information of the IC card 1500 being inserted into the PTS terminal 1700 here is updated with the credit information by the dividend and the information of the newly given point (S306) by an end operation of the player, after which the updated IC card 1500 is discharged from the PTS terminal 1700. That is, the IC card 1500 is returned to the player (S307).

When the player participates in a specific event, the IC card 1500 of the non-member in use is inserted into a card reader and writer of an event terminal provided for the event to participate in the event (S308). Here, a point given for the event participation is written to the IC card 1500 inserted into the event terminal. That is, the point balance is updated by adding the point given therefor to the point balance being stored in the IC card 1500 (S309). The IC card 1500 to which the point is given is returned to the player (S310).

Thus, in the IC card 1500 of the non-member, in addition to the dividend given in the game play, the points given by the game play and the event participation are accumulated, and the credit by the accumulated point and dividend can be inserted into the game play in the slot machine 1010. Here, since the IC card 1500 of the non-member of an related art is different from the IC card 1500 of the member and is not associated with the player's personal information, when the player runs out of the balance of the IC card 1500 of the non-member (credit balance written by inserting cash and credit balance written as the dividend of the game play), the IC card 1500 is often discarded because it is not necessary to own the IC card 1500. On the other hand, in the embodiment, since a point distributed for promotion, a point corresponding to a credit inserted into a game, a point given by participating in an event, and the like are stored in the IC card 1500 of the non-member, even though the credit balance runs out, the player continues to use the IC card 1500 of the non-member without discarding the IC card 1500 thereof when the point balance remains. As described above, even in the case of the IC card 1500 of the non-member, the player continues to use the IC card 1500, thereby making it possible not only to execute the determination processing illustrated in FIGS. 11 and 12 from the history information, but also to determine the game dependency and take measures corresponding to the determination result.

The player can take the IC card 1500 of the non-member to which the point and the credit balance are written to the cashier 202 (FIG. 1) for the cash conversion (S311). Here, the player inserts the IC card 1500 of the non-member into an information card reader and writer installed in the cashier 202, such that the information card reader and writer reads the credit balance and the point balance from the IC card 1500. Here, when the player is a player already registered as a member, the player inputs member information, such that the credit balance and the point balance read from the IC card 1500 of the non-member are transmitted to the information processing device 500 in association with the member information, and then are stored in the database 560 of the information processing device 500 as the balance information of the member (S312). As described above, even when the IC card 1500 of the non-member is continuously used, the history information thereof is stored in the database 560 of the information processing device 500, whereby, for example, the pieces of history information can be unitarily managed in the database 560 of the information processing device 500 even though the player owns the plurality of IC cards 1500 of the non-member.

Thus, in the embodiment, even in the case of the IC card 1500 of the non-member which is not registered as a member, a plurality of types of balance information usable for the game play such as the credit balance and the point balance are configured to be stored, thereby increasing a possibility that any kind of balance always remains. Accordingly, a player has higher possibility of continuing to use the IC card 1500, such that it is possible to more accurately determine the game dependency of the player.

While the embodiment of the present invention is described, the embodiment thereof is merely described with a specific example and does not particularly limit the present invention, and a specific configuration of each device, and the like can be appropriately changed in design. The effects described in the embodiment of the present invention are those merely enumerating the most suitable effects resulting from the present invention, and the effects of the present invention are not limited to those described in embodiment of the present invention.

In the above-described detailed descriptions, a characteristic part is mainly described so as to more easily understand the present invention. The present invention is not limited to the embodiment described in the detailed descriptions, but can be also applied to other embodiments and the scope of application thereof is varied. The terminology and the phase used in the present specification are used to accurately describe the present invention, and are not used to limit the interpretation of the present invention. It may be easy for those skilled in the art to reconsider other configurations, systems, methods, and the like included in the concept of the present invention from the concept of the present invention described in the present specification. Therefore, the description of the scope of the claims shall be deemed to include an equivalent configuration without departing from the scope of the technical ideas of the present invention. An object of the abstract is to enable the patent office, a general public institution, and an engineer belonging to the technical field who is not familiar with patents, legal terms, or technical terms to quickly determine the technical content of the present application and nature thereof with a simple investigation. Therefore, the abstract is not intended to limit the scope of the invention to be evaluated by the descriptions of the scope of the claims. In order to fully understand the object of the present invention and the specific effect thereof, it is desirable that the literatures already disclosed are interpreted with due consideration.

The above-described detailed descriptions include the processing executed by a computer. The above descriptions and expressions are intended to help those skilled in the art to understand most efficiently. In the present specification, each used to derive one result should be understood as processing that is not self-contradictory. In each step, transmission and reception, recording, and the like of an electrical or magnetic signal are performed. In the processing in each step, while such a signal is represented with bits, values, symbols, characters, terms, numbers, and the like, it should be noted that these are merely used for the convenience of the descriptions. While the processing in each step may be described with expressions common to human behavior, the processing described in the present specification is basically performed by various devices. Other configurations required for performing each step become obvious from the above descriptions.

PARTS LIST

100 information management system
201 member information card issuing device
500 information processing device
560 database
1010A, 1010B slot machine
1500 IC card
1700 PTS terminal

What is claimed is:

1. An information management system, comprising:
a terminal device communicably connected to a gaming machine capable of playing a game according to an inserted game value; and
an information processing device capable of communicating with the terminal device, wherein
the terminal device includes
an information medium payout device that pays out a portable type information medium associated with balance information representing a balance of a game value according to a result of the game, and
a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to the information processing device, and
the information processing device includes
a history information storage device that stores the information medium identification information, the insertion information associated with the information medium identification information, the game information, the balance information, and the gaming machine identification information as history information unique to the information medium, and
a determination device that determines a game addiction state of a player based upon the history information;
wherein, the determination device determines the game addiction state based upon a history of the insertion information when the number of times of game value insertions in a predetermined period exceeds a predetermined value.

2. The information management system according to claim 1, wherein
the terminal device
includes an information reader capable of reading out first game value information imparted on the condition of exchange with a monetary value and usable for playing the game, and reading out second game value information imparted under a specific condition and usable for playing the game from the information medium, and
provides the read game value information to the game.

3. The information management system according to claim 1, wherein
when the information medium is inserted at the start of the game, the information medium payout device associates the inserted information medium and the balance information and pays out the information medium.

4. The information management system according to claim 1, wherein
the balance information is information to be written to the information medium.

5. The information management system according to claim 1, wherein
the information processing device includes a database in which identification information of the information medium and personal information of the player are associated with each other and stored,
as the information medium, there are a first information medium associated with the specific personal information and a second information medium in which the associated personal information does not exist, and
the information medium payout device pays out the second information medium as a non-member information medium.

6. The information management system according to claim 5, wherein
the transmission device transmits human body information acquired by a human body information acquisition device that acquires the human body information of the player in association with the information medium identification information, and
the information processing device stores the human body information associated with the information medium identification information in the database, and collects the presence of the information medium associated with the same human body information.

7. An information management system, comprising:
a gaming machine capable of playing a game according to an inserted game value; and
an information processing device capable of communicating with the gaming machine, wherein
the gaming machine includes
an information medium payout device that pays out a portable type information medium associated with balance information representing a balance of a game value according to a result of the game, and
a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to the information processing device, and
the information processing device includes
a history information storage device that stores the information medium identification information, the insertion information associated with the information medium identification information, the game information, the balance information, and the gaming machine identification information as history information unique to the information medium, and
a determination device that determines a game addiction state of a player based upon the history information when the number of times of game value insertions in a predetermined period exceeds a predetermined value.

8. A terminal device communicably connected to a gaming machine capable of playing a game according to an inserted game value, the device comprising:
an information medium payout device that pays out a portable type information medium associated with balance information representing a balance of a game value according to a result of the game;
a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to outside; and, a receiving unit that receives game addiction state information from an information processing device including a determination device that determines a game addiction state of a player based upon the history information when the number of times of game value insertions in a predetermined period exceeds a predetermined value.

9. The terminal device according to claim 8, further comprising:
an information reader capable of reading out first game value information imparted on the condition of exchange with a monetary value and usable for playing the game, and reading out second game value information imparted under a specific condition and usable for playing the game from the information medium, wherein
the read game value information is provided to the game.

10. The information management system according to claim 1, wherein when the information medium is inserted at the start of the game, the information medium payout device associates the inserted information medium and the balance information and pays out the information medium.

11. The information management system according to claim 2, wherein the balance information is information to be written to the information medium.

12. The information management system according to claim 3, wherein the balance information is information to be written to the information medium.

13. The information management system according to claim 2, wherein
the information processing device includes a database in which identification information of the information medium and personal information of the player are associated with each other and stored,
as the information medium, there are a first information medium associated with the specific personal information and a second information medium in which the associated personal information does not exist, and
the information medium payout device pays out the second information medium as a non-member information medium.

14. The information management system according to claim 3, wherein
the information processing device includes a database in which identification information of the information medium and personal information of the player are associated with each other and stored,
as the information medium, there are a first information medium associated with the specific personal information and a second information medium in which the associated personal information does not exist, and
the information medium payout device pays out the second information medium as a non-member information medium.

15. The information management system according to claim 4, wherein
the information processing device includes a database in which identification information of the information medium and personal information of the player are associated with each other and stored,
as the information medium, there are a first information medium associated with the specific personal information and a second information medium in which the associated personal information does not exist, and
the information medium payout device pays out the second information medium as a non-member information medium.

16. An information management system, comprising:
a terminal device communicably connected to a gaming machine capable of playing a game according to an inserted game value; and
an information processing device capable of communicating with the terminal device, wherein
the terminal device includes
an information medium payout device that pays out a portable type information medium associated with balance information representing a balance of a game value according to a result of the game, and
a transmission device that transmits information medium identification information unique to the paid-out information medium, insertion information representing the inserted game value associated with the information medium identification information, game information representing a history of a game executed based upon the inserted game value, the balance information, and gaming machine identification information identifying the gaming machine in which the balance information is generated to the information processing device, and
the information processing device includes
a history information storage device that stores the information medium identification information, the insertion information associated with the information medium identification information, the game information, the balance information, and the gaming machine identification information as history information unique to the information medium, and
a determination device that determines a game addiction state of a player based upon the history information;
wherein, the determination device determines the game addiction state based upon at least one of:
a history of the insertion information when the number of times of game value insertions in a predetermined period exceeds a predetermined value;
a history of the insertion information corresponding to an amount of money inserted for each of a plurality of games exhibits an increase for each game;
a history of the insertion information exhibits continued game play despite a previous big win; and,
a history of insertion information exceeds a preset insertion limit amount.

* * * * *